US011993474B2

(12) United States Patent
Koga

(10) Patent No.: US 11,993,474 B2
(45) Date of Patent: May 28, 2024

(54) SHEET FEEDING APPARATUS AND IMAGE FORMING APPARATUS

(71) Applicant: CANON KABUSHIKI KAISHA, Tokyo (JP)

(72) Inventor: Satoshi Koga, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/559,876

(22) Filed: Dec. 22, 2021

(65) Prior Publication Data

US 2022/0112041 A1 Apr. 14, 2022

Related U.S. Application Data

(63) Continuation of application No. 16/539,281, filed on Aug. 13, 2019, now Pat. No. 11,230,450, which is a continuation of application No. 15/935,933, filed on Mar. 26, 2018, now Pat. No. 10,479,626, which is a continuation of application No. 15/333,929, filed on Oct. 25, 2016, now Pat. No. 9,957,122.

(30) Foreign Application Priority Data

Oct. 30, 2015 (JP) ................................ 2015-213886

(51) Int. Cl.
*B65H 1/04* (2006.01)
*B65H 1/26* (2006.01)
*G03G 15/00* (2006.01)
*G03G 21/16* (2006.01)

(52) U.S. Cl.
CPC ............... *B65H 1/04* (2013.01); *B65H 1/266* (2013.01); *G03G 15/6502* (2013.01); *G03G 15/6529* (2013.01); *G03G 15/6552* (2013.01); *G03G 21/1695* (2013.01); *B65H 2405/1122* (2013.01); *B65H 2511/11* (2013.01); *B65H 2511/20* (2013.01); *B65H 2801/12* (2013.01); *G03G 2221/1684* (2013.01)

(58) Field of Classification Search
CPC ...... B65H 1/04; B65H 1/266; B65H 2511/11; B65H 2511/20; B65H 2405/1122; B65H 2405/1124; G03G 15/6502; G03G 2221/1684
USPC ........................................................ 271/171
See application file for complete search history.

(56) References Cited

U.S. PATENT DOCUMENTS 8,770,578 B2 * 7/2014 Yamamoto ............ B65H 1/266 271/171
2015/0298921 A1 * 10/2015 Ishikura .................. B65H 1/04 271/171

* cited by examiner

*Primary Examiner* — Patrick Cicchino
(74) *Attorney, Agent, or Firm* — Canon U.S.A., Inc. I.P. Division

(57) ABSTRACT

A sheet feeding apparatus includes a sheet containing unit and a sheet feeding device to feed sheets in the sheet containing unit. The sheet containing unit includes a main body to hold sheets, a drawer member capable of being drawn from the main body, a restricting member movable in a direction parallel to a sheet feeding direction, a first retaining member disposed at the main body, and a second retaining member disposed at the drawer member. The drawer member holds the sheets together with the main body when drawn from the main body. The restricting member restricts an upstream end position of the contained sheets. The first retaining member retains the restricting member at a first position. The second retaining member retains the restricting member at a second position.

10 Claims, 15 Drawing Sheets

SHEET FEEDING APPARATUS AND IMAGE FORMING APPARATUS

CROSS-REFERENCE TO RELATED APPLICATION

This application is a continuation of U.S. patent application Ser. No. 16/539,281, filed on Aug. 13, 2019, which is a continuation, and claims the benefit, of U.S. application Ser. No. 15/935,933, filed on Mar. 26, 2018 and issued on Nov. 19, 2019 as U.S. Pat. No. 10,479,626, which is a continuation, and claims the benefit, of U.S. application Ser. No. 15/333,929, filed on Oct. 25, 2016 and issued on May 1, 2018 as U.S. Pat. No. 9,957,122, which claims the benefit of Japanese Patent Application No. 2015-213886 filed Oct. 30, 2015, all of which are hereby incorporated by reference herein in their entirety.

BACKGROUND OF THE INVENTION

Field of the Invention

The present disclosure relates to sheet feeding apparatuses and image forming apparatuses, and in particular, to a configuration for holding a restricting member that restricts the trailing end of sheets.

Description of the Related Art

Widespread image forming apparatuses, such as copying machines, printers, and facsimiles, are equipped with a sheet feeding apparatus from which sheets are fed to an image forming unit to form images. Typical examples of such a sheet feeding apparatus feed sheets in a sheet cassette provided in an image forming apparatus main body to the image forming unit using a feed roller.

The sheet cassette is provided with a trailing-end restricting member that aligns the trailing ends of the contained sheets in a sheet feeding direction (hereinafter referred to as "trailing end") and a side-edge restricting member that aligns the side edges of the sheets in a direction perpendicular to the sheet feeding direction (hereinafter referred to as "cross direction"). In such a sheet cassette, the leading end of the sheets are always aligned in position by restricting the side edge position of the sheets using the trailing-end restricting member and by restricting the trailing end position of the sheets using the side-edge restricting member. This enables stable sheet feeding regardless of the size of the sheets contained in the sheet cassette.

A known sheet cassette in the related art can give a sense of clicking to a user who is placing standard-size sheets, such as A3 or A4, in the sheet cassette when the user moves the trailing-end restricting member to a position at which the trailing ends of the sheets are aligned (Japanese Patent No. 4563309). The sheet cassette has engaged portions at every standard-size positions on a rail on which the trailing-end restricting member moves. By elastically engaging one of the engaged portions with an engaging portion of the trailing-end restricting member, the user is given the sense of clicking.

Image forming apparatuses are decreasing in size to enhance space utilization. The decrease in the size of image forming apparatuses can make the image forming apparatus main body smaller than sheets for use. To address this, a sheet cassette provided with a drawer member that can be drawn together with the trailing-end restricting member is disclosed in Japanese Patent Laid-Open No. 2008-184297. The drawer member is drawn for use according to the size of the sheets. With this configuration, the drawer member is drawn for use only when large-size sheets are to be held, in other words, the drawer member is drawn only when large-size sheets are to be used. This solves the problem of the installation space.

In the sheet cassette provided with an extension cassette, which is the drawer member, the trailing-end restricting member is held in the extension cassette so as to be slidable in the sheet feeding direction. The claws of the trailing-end restricting member engage with a rack gear at the bottom of the extension cassette to restrict the movement of the trailing-end restricting member.

Another example of the sheet cassette holds non-standard-size sheets, in addition to the standard-size sheets. An example of this sheet cassette is separately provided with a retaining unit for retaining the trailing-end restricting member at a position at which the trailing end position of standard-size sheets is to be restricted and a retaining unit for retaining the trailing-end restricting member at a position at which the trailing end position of non-standard-size sheets is to be restricted (Japanese Patent Laid-Open No. 2007-223686).

In general sheet cassettes provided with the extension cassette, the trailing-end restricting member is slidably mounted to the extension cassette. The retaining unit for retaining the trailing end position of non-standard-size sheets and the engaged portion for standard-size sheets for giving the sense of clicking at the trailing-end restricting member are also provided at the extension cassette.

Suppose a sheet cassette capable of holding letter-size sheets of landscape orientation in a state in which the extension cassette is pushed into the sheet cassette and capable of holding ledger-size sheets of portrait orientation in a state in which the extension cassette is drawn. With this sheet cassette, in holding relatively small standard-size sheets, such as letter-size sheets of landscape orientation, A4-size sheets of landscape orientation, B5-size sheets of landscape orientation, or A6-size sheets of landscape orientation, the extension cassette is in a pushed state. This extension cassette is provided with an engaged portion (an engaged portion for small-size sheets) for giving the user the sense of clicking at a position corresponding to the trailing ends of standard-size sheets in a state in which the extension cassette is pushed into the sheet cassette.

In holding relatively large standard-size sheets, such as ledger-size sheets of portrait orientation, legal-size sheets of portrait orientation, A3-size sheets of portrait orientation, or B4-size sheets of portrait orientation, or large non-standard-size sheets, the extension cassette is drawn from the sheet cassette. When the extension cassette is thus drawn, the engaged portion for small-size sheets can come to the vicinity of the trailing ends of large standard-size sheets or large non-standard-size sheets.

When the trailing-end restricting member is set at a position at which the trailing end position of large standard-size sheets or large non-standard-size sheets is to be restricted in this state, the trailing-end restricting member can engage with the engaged portion for small-size sheets, in which case the user has the sense of clicking. The sense of clicking causes the user to recognize that the trailing-end restricting member is held at a position at which the trailing end position of large standard-size sheets or non-standard-size sheets are to be restricted. However, the trailing-end restricting member is not held at the position at which the trailing end position of large standard-size sheets or non-standard-size sheets is to be restricted, in other words, the trailing-end restricting member is held at an improper position. This can cause trouble in sheet feeding.

SUMMARY OF THE INVENTION

The present disclosure provides a sheet feeding apparatus and an image forming apparatus in which a restricting member can be held at a proper position even when an extension cassette (a drawer member) is drawn.

A sheet feeding apparatus according to an aspect of the present disclosure includes a sheet containing unit configured to hold sheets, and a sheet feeding device configured to feed the sheets contained in the sheet containing unit, wherein the sheet containing unit includes: a main body configured to hold sheets, a drawer member disposed in the main body to be capable of being drawn from the main body, wherein the drawer member is configured to hold the sheets together with the main body when drawn from the main body, a restricting member disposed at the drawer member to be movable in a direction parallel to a sheet feeding direction, wherein the restricting member is configured to restrict an upstream end position of the contained sheets in the sheet feeding direction, a first retaining member disposed at the main body, wherein the first retaining member is configured to retain the restricting member at a first position at which an upstream end position of a first standard-size sheet in the sheet feeding direction is to be restricted, and a second retaining member disposed at the drawer member, wherein the second retaining member is configured to retain the restricting member at a second position at which an upstream end position of a sheet of a second size larger than the first standard size in the sheet feeding direction is to be restricted in a state in which the drawer member is drawn.

In an example, a main cassette has grooves for retaining a trailing-end restricting unit at a position at which an upstream end position of small standard-size sheets in a sheet feeding direction is to be restricted. An extension cassette has a rack gear for retaining the trailing-end restricting unit at a position at which upstream end positions of large standard-size sheets and large non-standard-size sheets in the sheet feeding direction are to be restricted. Further features of the present invention will become apparent from the following description of exemplary embodiments with reference to the attached drawings.

DESCRIPTION OF THE EMBODIMENTS

Figure 1A:
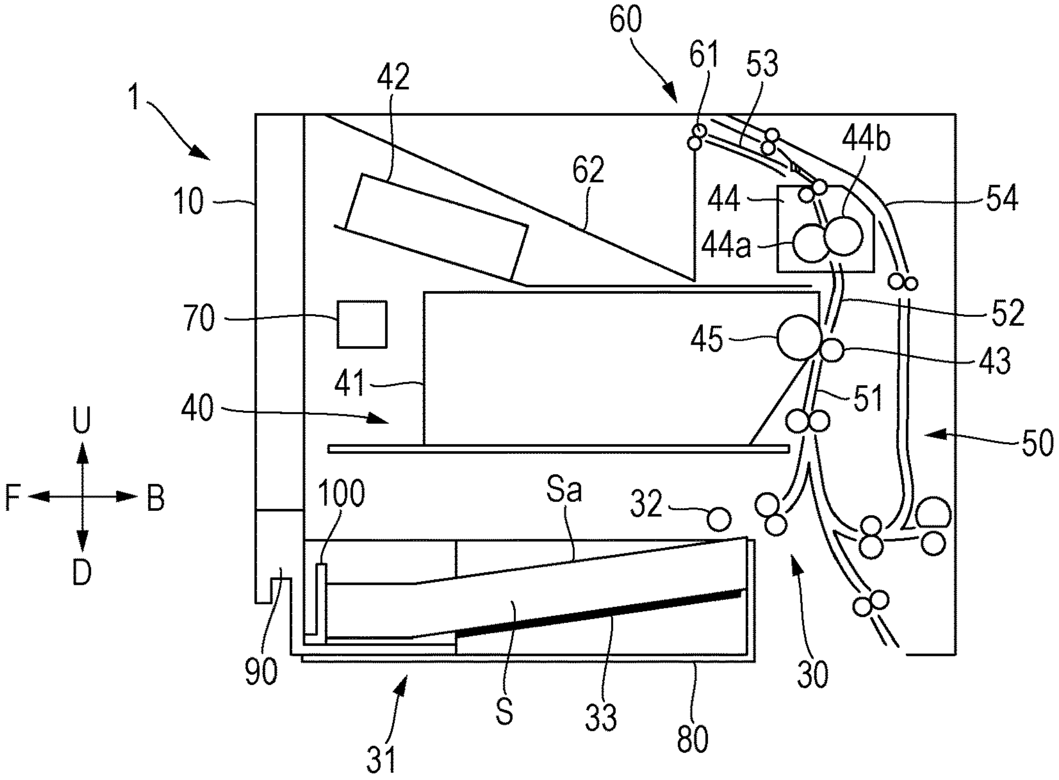
FIG. 1A is a diagram illustrating, in outline, the state of a laser printer, which is an example of an image forming apparatus equipped with a sheet feeding apparatus according to a first embodiment of the present disclosure, in a state in which an extension cassette of a sheet cassette is pushed therein.
Figure 1B:
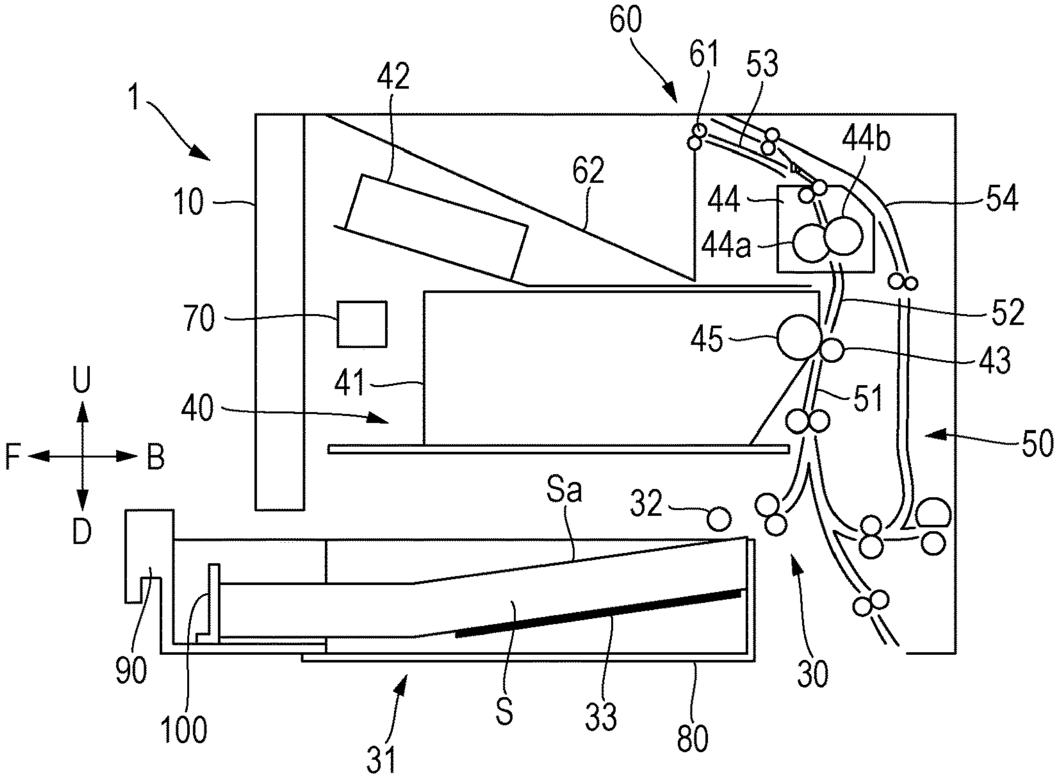
FIG. 1B is a diagram illustrating the state of the sheet cassette when the extension cassette is drawn.

Embodiments of the present disclosure will be described hereinbelow with reference to the drawings. FIGS. 1A and 1B are diagrams illustrating, in outline, the configuration of a laser printer, which is an example of an image forming apparatus equipped with a sheet feeding apparatus according to a first embodiment of the present disclosure. In the following description, the near side when the viewer faces the laser printer is the front, further from the viewer is the back, the left is a leftward direction, the right is a rightward direction, the above is an upward direction, and the down is a downward direction. In FIGS. 1A and 1B and the other diagrams, arrow F indicates the front, arrow B indicates the back, arrow L indicates the leftward direction, arrow R indicate the rightward direction, arrow U indicate the upward direction, and arrow D indicates the downward direction.

As shown in FIGS. 1A and 1B, the laser printer 1 includes a printer main body 10, which is an image forming apparatus main body. The printer main body 10 includes a sheet feeding apparatus 30, an image forming unit 40, a sheet conveying unit 50, a sheet discharging unit 60, and a control unit 70. Sheets S are recording media on which toner images are formed, for example, plain paper, synthetic resin sheets, and cardboard.

The sheet feeding apparatus 30 is disposed at the lower part of the printer main body 10 and includes a sheet cassette 31 (a sheet containing unit) in which the sheets S are stacked and a feed roller 32 (a sheet feeding device). The sheet feeding apparatus 30 feeds the sheets S to the image forming unit 40. The details of the sheet cassette 31 will be described later.

The image forming unit 40 includes a process cartridge 41, a laser scanner 42, a transfer roller 43, and a fixing unit 44 and forms an image. The process cartridge 41 is a combination of a photosensitive drum 45 and processing units, such as a developing unit and a charging roller (not shown), working on the photosensitive drum 45. The process cartridge 41 is attachable to detachable from the printer main body 10.

The fixing unit 44 includes a fixing roller 44*a* and a pressure roller 44*b*. The sheet S is conveyed through a fixing nip formed between the fixing roller 44*a* and the pressure roller 44*b*, so that the toner image transferred to the sheet S is fixed to the sheet S by pressure and heat. The sheet conveying unit 50 conveys the sheet S fed from the sheet feeding apparatus 30 to the image forming unit 40 and from the image forming unit 40 to the sheet discharging unit 60. The sheet conveying unit 50 includes a pretransfer conveying path 51, a prefixing conveying path 52, a discharge path 53, and a re-conveying path 54.

The sheet discharging unit 60 includes a discharge roller pair 61 disposed downstream of the discharge path 53 and a discharge cassette 62 at the upper part of the printer main body 10. The control unit 70 includes a CPU (not shown), a ROM that stores programs for controlling the individual units, and an input and output circuit that inputs and outputs signals from and to the outside.

The image forming operation of the thus-configured laser printer 1 will be described. When the image forming operation is started, the photosensitive drum 45 rotates, the surface of the photosensitive drum 45 is electrically charged by the charging roller (not shown) in the process cartridge 41, and the photosensitive drum 45 is irradiated with a laser beam according to image information by the laser scanner 42. This forms an electrostatic latent image on the surface of the photosensitive drum 45. The electrostatic latent image is developed with toner into a toner image by the developing unit (not shown) in the process cartridge 41.

The feed roller 32 rotates in parallel with the toner-image forming operation to separately feed an uppermost sheet Sa in the sheet cassette 31. Subsequently, the sheet Sa passes through the pretransfer conveying path 51 into a transfer portion between the photosensitive drum 45 and the transfer roller 43 in timing with the toner image formed on the photosensitive drum 45. In the transfer portion, the toner image is transferred as an unfixed image to the sheet Sa by bias application to the transfer roller 43, and the sheet Sa to which the toner image is transferred is conveyed to the fixing unit 44.

While the sheet Sa is passing through the fixing unit 44, the unfixed toner image is heated and pressed and is fixed to the surface of the sheet Sa. After that, for example, when an image is to be formed on one surface of the sheet Sa, the sheet Sa is conveyed to the discharge path 53 and is discharged and stacked on the discharge cassette 62 by the discharge roller pair 61. When images are to be formed on both surfaces of the sheet Sa, the sheet Sa is conveyed to the re-conveying path 54 and is again conveyed to the image forming unit 40, with the front and back reversed.

Figure 2:
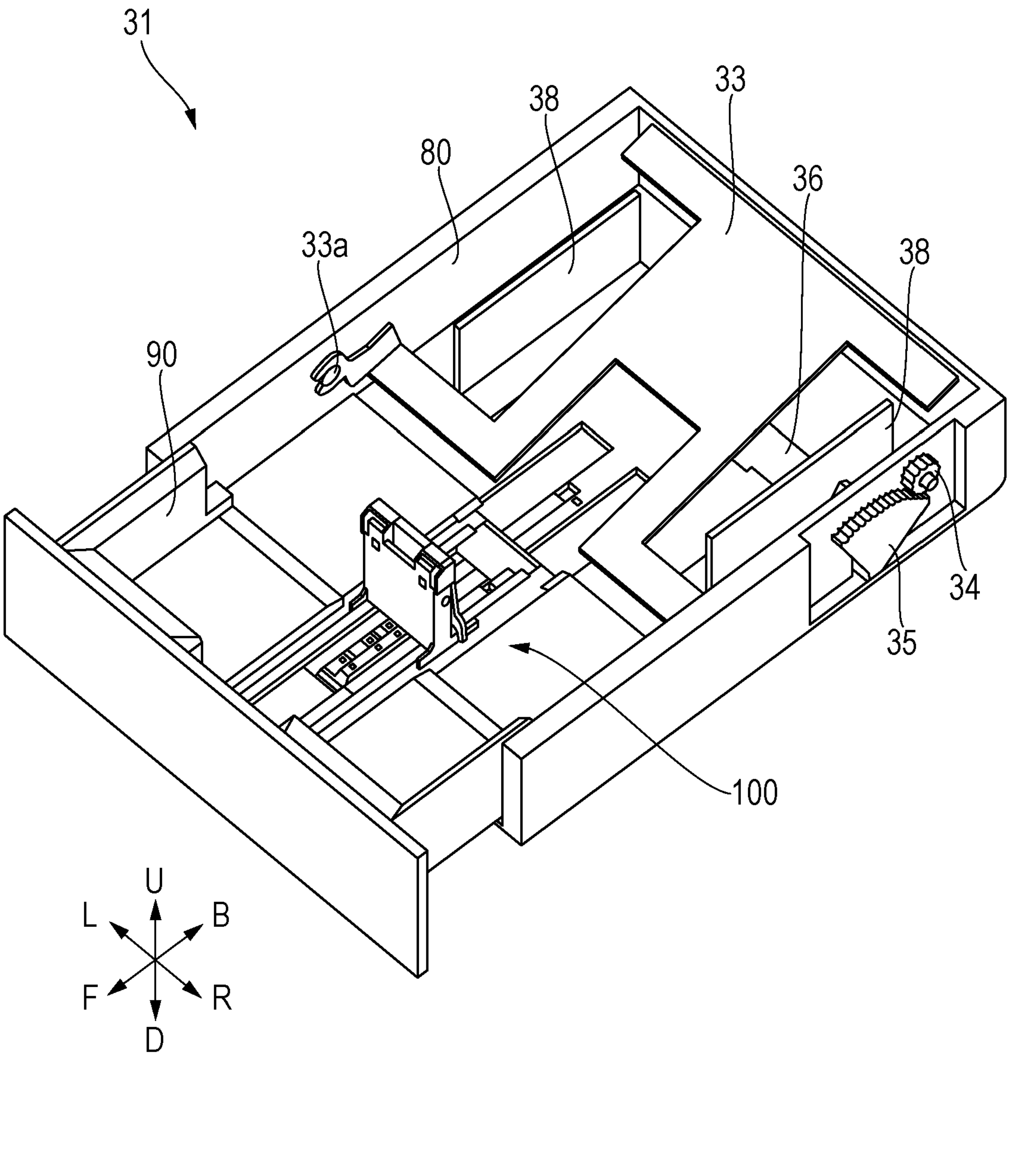
FIG. 2 is a perspective view of the sheet cassette.

Next, the configuration of the sheet cassette 31 according to this embodiment will be described. The sheet cassette 31 is detachably mounted in the printer main body 10. As shown in FIG. 2, the sheet cassette 31 includes a main cassette 80, which is a main body for holding sheets S, and an extension cassette 90, which is a drawer member that can be drawn in the front-to-back direction (a sheet feeding direction) with respect to the main cassette 80. When sheets of a predetermined size or more are to be held, the extension cassette 90 is drawn to hold the sheets together with the main cassette 80. In a state in which the extension cassette 90 is housed, the sheet cassette 31 is capable of holding small-size sheets to large-size sheets by moving the extension cassette 90 in the front-to-back direction according to the size of the sheets to be held, that is, the length of the sheets in the sheet feeding direction.

The sheet cassette 31 includes a pair of width restricting units 38 that restrict the lateral position of the held sheets S, which is a cross direction perpendicular to the sheet feeding direction, and a trailing-end restricting unit 100, which is a trailing-end restricting member that restricts the end position of the sheets S upstream in the front-to-back direction, which is the upstream end in the sheet feeding direction. The width restricting units 38 are supported by the main cassette 80 so as to be slidable in the lateral direction. The trailing-end restricting unit 100 is supported by the extension cassette 90 so as to be movable parallel to the sheet feeding direction, or the front-to-back direction. The details of the trailing-end restricting unit 100 will be described later.

In the laser printer 1 of this embodiment, the feed roller 32 is disposed at the back of the printer main body 10, as shown in FIGS. 1A and 1B. Because of this, the sheet cassette 31 is mounted in the printer main body 10 such that the feed roller 32 is positioned above the main cassette 80. Such position of the sheet cassette 31 allows the extension cassette 90 to be drawn forward of the printer main body 10.

FIG. 1A illustrates the state of the sheet cassette 31 when the extension cassette 90 is pushed therein. In this state, that is, when the extension cassette 90 is at a first position at which the extension cassette 90 is housed in the main cassette in the main body, the front surface of the extension cassette 90 is flush with the front wall of the printer main body 10. FIG. 1B illustrates the state of the sheet cassette 31 when the extension cassette 90 is drawn. In this state, that is, when the extension cassette 90 is at a second position at which the extension cassette 90 is drawn, the front surface of the extension cassette 90 protrudes in the forward direction from the printer main body 10.

The extension cassette 90 is drawn when large standard-size sheets, which are standard-size sheets larger than a predetermined size, or large non-standard-size sheets, which are non-standard-size sheets larger than a predetermined size, are to be held in the sheet cassette 31. In a state in which the extension cassette 90 is housed, small standard-size sheets, which are standard-size sheets smaller than a predetermined size, or small non-standard-size sheets, which are non-standard-size sheets smaller than the predetermined size, can be held. In this embodiment, the largest-size sheet of the small standard-size sheets is an A4-size sheet of portrait orientation, the largest-size sheet of the large standard-size sheets is a legal-size sheet of portrait orientation, and sheets between the A4-size of portrait orientation and the legal-size of portrait orientation are non-standard-size sheets.

As shown in FIG. 2, the sheet cassette 31 is provided with a sheet stacking plate 33 on which sheets S are to be stacked. The sheet stacking plate 33 is supported by the main cassette 80 so as to be rotatable about a rotation center 33*a*. The sheet cassette 31 includes a driving transmission gear 34 that transmits a driving force from a driving source (not shown), a sector gear 35 that receives the driving force from the driving transmission gear 34, and a swing arm 36 that rotates in an up-and-down direction together with the sector gear 35 about the axis of rotation of the sector gear 35.

The swing arm 36 is disposed below the sheet stacking plate 33. The upward rotation of the swing arm 36 together with the sector gear 35 raises the sheet stacking plate 33. The printer main body 10 includes a sensor (not shown) for detecting that the uppermost sheet Sa of the sheets held in the sheet cassette 31 (FIGS. 1A and 1B) has come into contact with the feed roller 32. The control unit 70 stops the driving source according to a signal from the sensor to stop the rise of the sheet stacking plate 33.

Figure 3A:
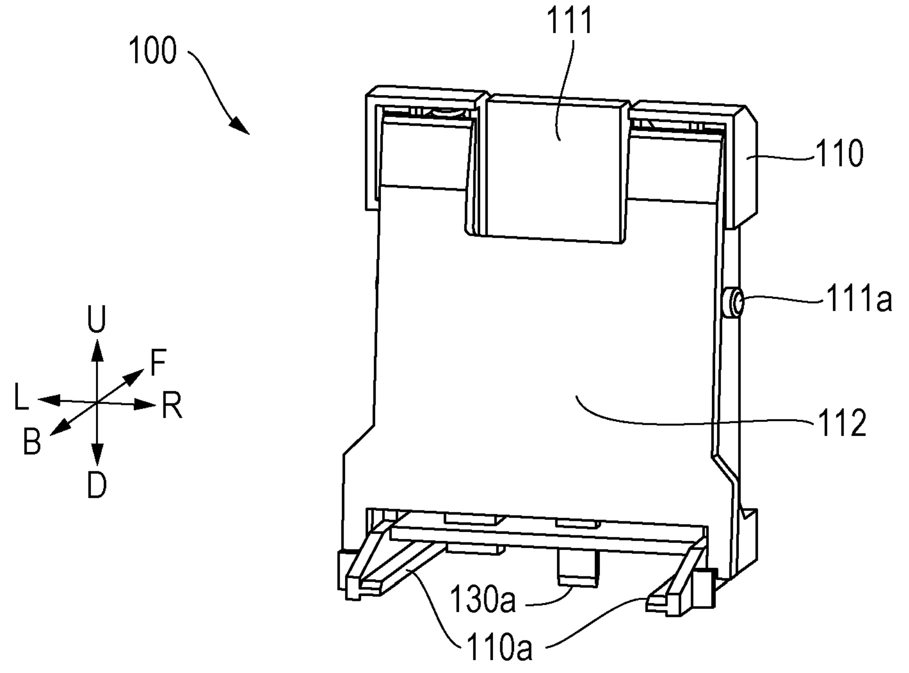
FIG. 3A is a perspective view of a trailing-end restricting unit provided at the sheet cassette.
Figure 3B:
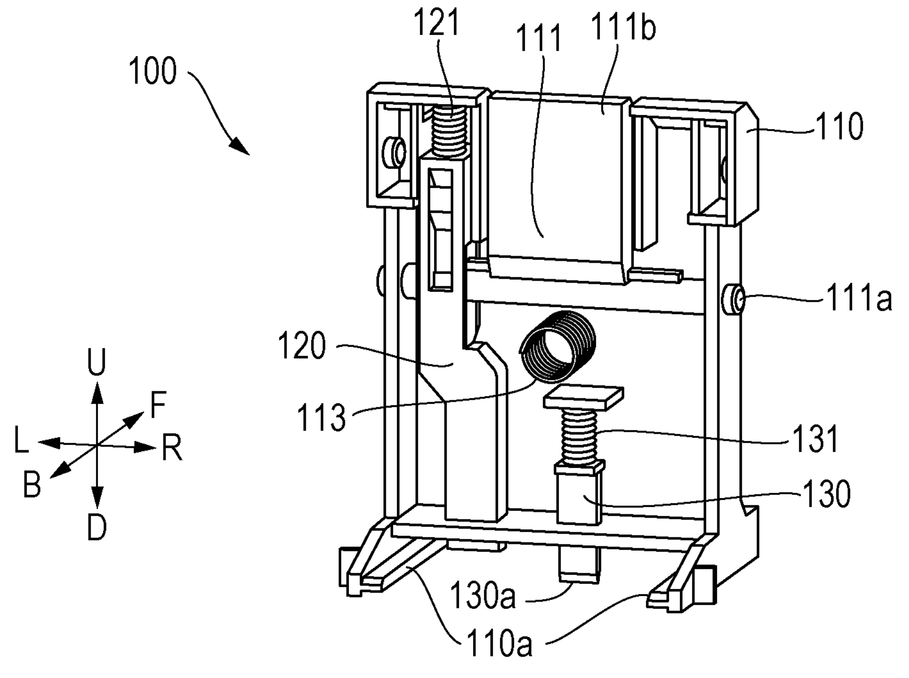
FIG. 3B is a perspective view of the trailing-end restricting unit, with a flap plate removed.

Next, the trailing-end restricting unit 100 will be described. As shown in FIG. 3A, the trailing-end restricting unit 100 includes a trailing-end restricting case 110 that holds the components, a control lever 111, and a flap plate 112 that presses the trailing ends of the sheets. As shown in FIG. 3B, the trailing-end restricting unit 100 further includes an elastic member 113 that urges the flap plate 112 in the backward direction, which is a direction in which the trailing ends of the sheets are pressed. The trailing-end restricting unit 100 further includes an engaging member 120 (hereinafter referred to as "second engaging member") having claws 120*c* (see FIGS. 4A and 4B) at the bottom to engage with the extension cassette 90 and a first elastic member 121 that urges the second engaging member 120 downward.

The trailing-end restricting unit 100 further includes an engaging member 130 (hereinafter referred to as "first engaging member" having a tapered engaging portion 130*a* at the bottom to engage with the main cassette 80 and a second elastic member 131 that urges the first engaging member 130 downwards. The second engaging member 120 and the first engaging member 130 are supported by the trailing-end restricting case 110 so as to be movable in the up-and-down direction.

Figure 5A:
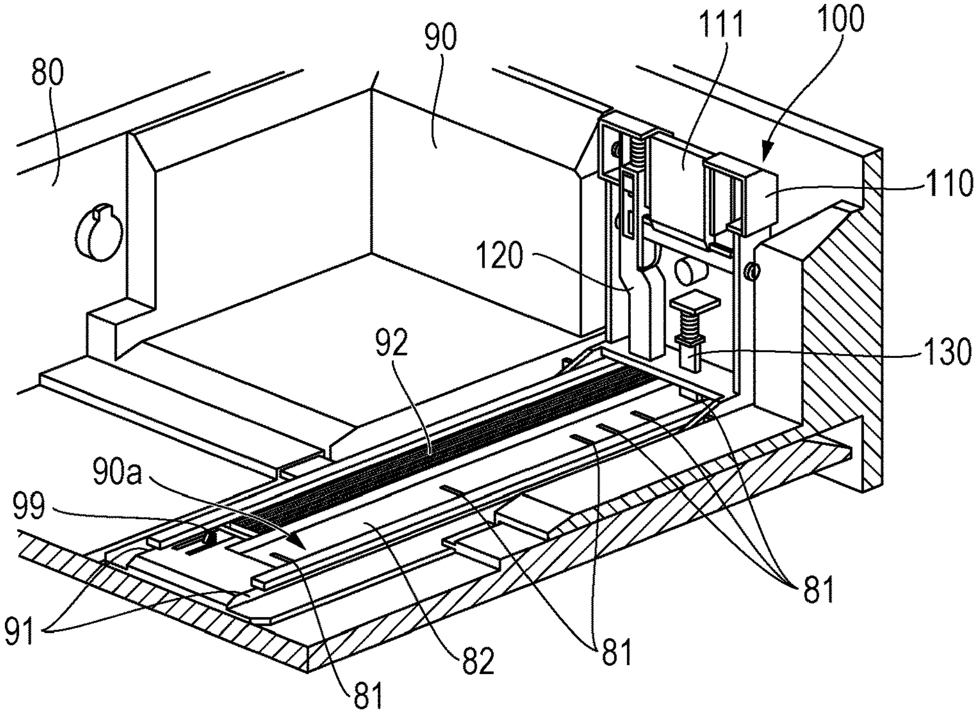
FIG. 5A is a diagram illustrating the sheet cassette, with the extension cassette pushed therein.
Figure 5B:
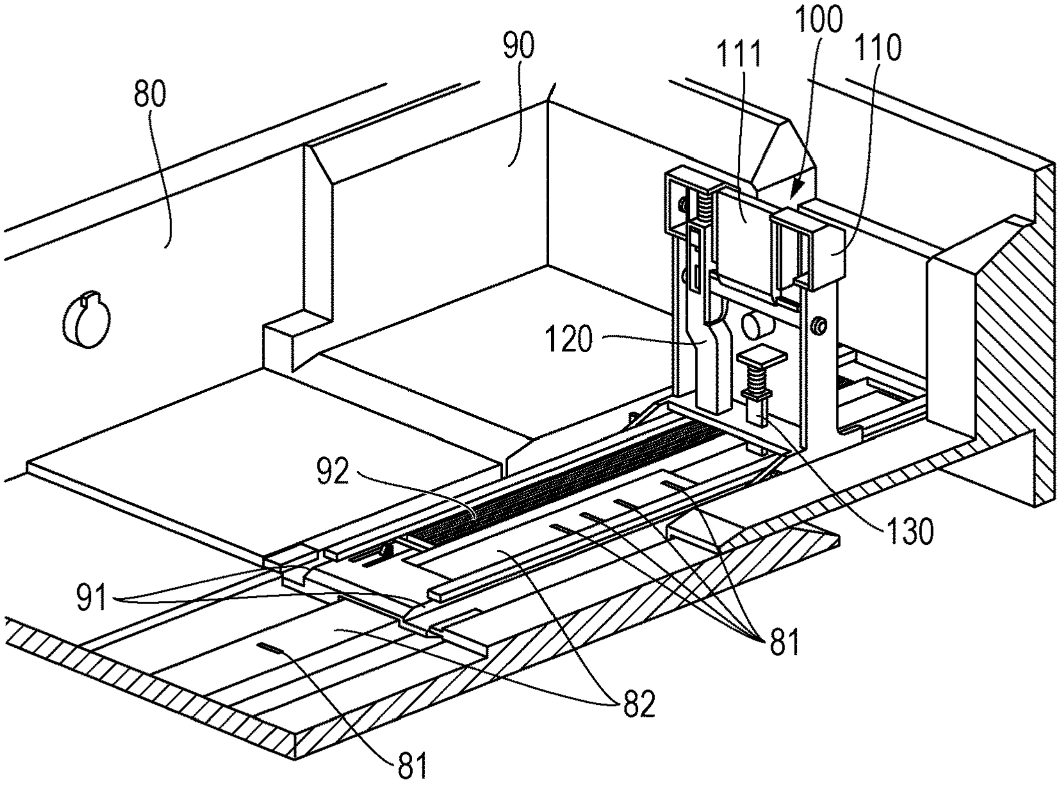
FIG. 5B is a diagram illustrating the sheet cassette, with the extension cassette drawn therefrom.

The trailing-end restricting case 110 includes guides 110*a* opposing in the lateral direction at the bottom. The guides 110*a* are slidably attached to rails 91 provided at the extension cassette 90 and extending in the sheet feeding direction, as shown in FIGS. 5A and 5B so that the trailing-end restricting unit 100 can move in the front-to-back direction with respect to the extension cassette 90. The extension cassette 90 is provided with a stopper 99, or a contact portion, shown in FIG. 5A, to prevent the trailing-end restricting unit 100 from coming off the extension cassette 90 when the extension cassette 90 is drawn.

Figure 4A:
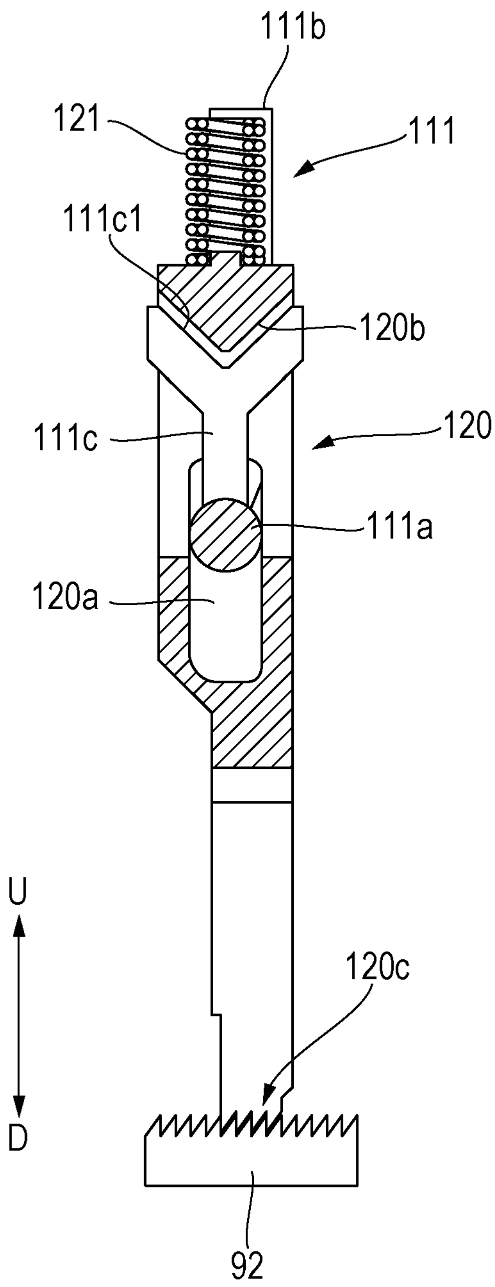
FIG. 4A is a diagram illustrating a state in which the trailing-end restricting unit and the extension cassette engage with each other.
Figure 4B:
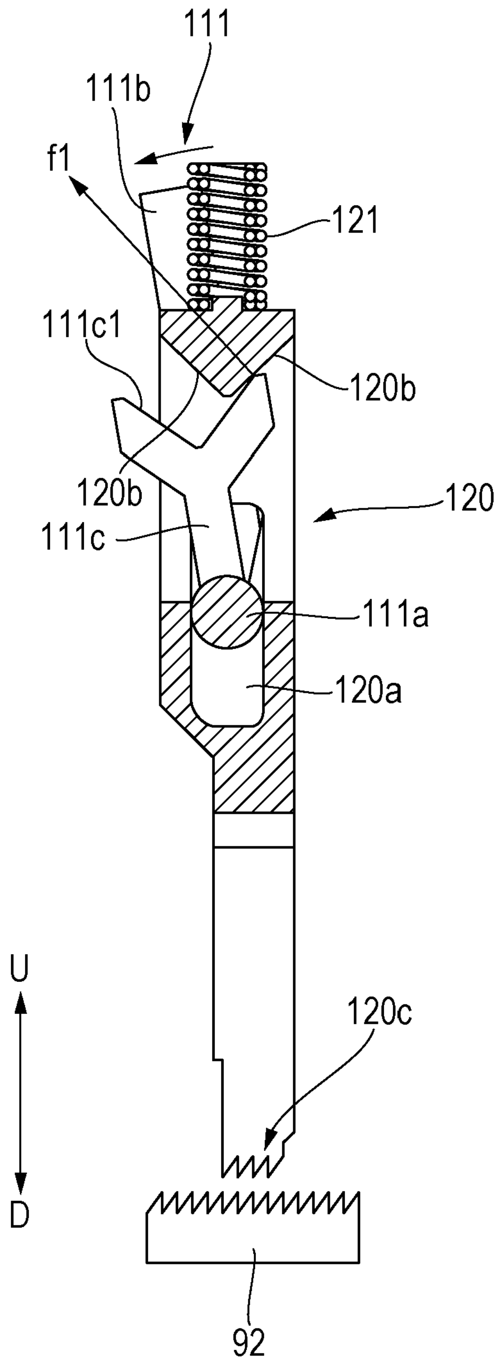
FIG. 4B is a diagram illustrating a state in which the engagement between the trailing-end restricting unit and the extension cassette is released.

The control lever 111 is held on the trailing-end restricting case 110 so as to be rotatable about a rotation shaft 111*a* and includes an operating portion 111*b* at the upper end (FIGS. 4A and 4B). As shown in FIG. 4A, the rotation shaft 111*a* passes through a vertically long hole 120*a* in the second engaging member 120. This allows the second engaging member 120 to be supported by the trailing-end restricting case 110 so as to be movable in the up-and-down direction via the rotation shaft 111*a* of the control lever 111.

The control lever 111 has a receiving portion 111*c* at one end of the rotation shaft 111*a* in the lateral direction. The receiving portion 111*c* has a V-shaped groove 111*c*1 at the top. The second engaging member 120 has, at the top, a tapered securing portion 120*b* that is fit in the V-shaped groove 111*c*1 of the receiving portion 111*c*. The securing portion 120*b* is generally urged downwards by the first elastic member 121 into the V-shaped groove 111*c*1 of the receiving portion 111*c*.

When the trailing end of the sheets is to be restricted by the trailing-end restricting unit 100, the trailing-end restricting unit 100 is moved to a position according to the size of the sheets. To move the trailing-end restricting unit 100, the control lever 111 is rotated in the direction of the arrow shown in FIG. 4B, for example. This operation causes the securing portion 120*b* of the second engaging member 120 to receive a force f1 from the V-shaped groove 111*c*1 of the receiving portion 111*c*. Since the second engaging member 120 is supported by the trailing-end restricting case 110 so as to be movable in the up-and-down direction, as described above, the second engaging member 120 subjected to the force f1 is raised upwards.

The extension cassette 90 (described later) has a rack gear 92, or a toothed portion, as shown in FIGS. 5A and 5B. As shown in FIG. 4A, the rack gear 92 and the claws 120*c* on the bottom of the second engaging member 120 engage with each other to restrict the movement of the trailing-end restricting unit 100. However, when the second engaging member 120 is raised, the engagement of the rack gear 92 and the claws 120*c* of the second engaging member 120 is released, as shown in FIG. 4B, to enable the trailing-end restricting unit 100 to move.

The first engaging member 130 is generally urged by the second elastic member 131 and is held, with the engaging portion 130*a* (shown in FIGS. 3A and 3B) fit in a groove 81 (shown in FIGS. 5A and 5B). However, when the trailing-end restricting unit 100 is moved, the first engaging member 130 is raised against the urging force of the second elastic member 131 and comes out of the groove 81. This allows the trailing-end restricting unit 100 to move while sliding the first engaging member 130 on the main cassette when the user moves the trailing-end restricting unit 100, with the control lever 111 rotated.

As shown in FIGS. 5A and 5*b*, the main cassette 80 includes a flat portion 82 extending in the front-to-back direction and grooves 81 (a first retaining member) provided in the flat portion 82 to hold the trailing-end restricting unit 100 at positions at which the trailing end positions of standard-size sheets are restricted. The grooves 81 are disposed at positions corresponding to the trailing ends of various small standard-size sheets to be held in the sheet cassette 31. When the trailing-end restricting unit 100 has moved to a position at which the trailing end position of small standard-size sheets is restricted (hereinafter referred to as "first trailing-end restricting position"), the first engaging member 130 disengageably engages with the corresponding one of the grooves 81 with the sense of clicking.

The sense of clicking when the trailing-end restricting unit 100 engages with the first engaging member 130 allows the user to recognize that the trailing-end restricting unit 100 is set at the first trailing-end restricting position. The extension cassette 90 has an opening 90*a* at a position corresponding to the flat portion 82. This allows the first engaging member 130 to engages with the grooves 81.

The extension cassette 90 further has the rack gear 92, which is a toothed portion for retaining the trailing-end restricting unit 100 at a position at which the trailing end position of large non-standard-size sheets is to be retained, across the moving range of the trailing-end restricting unit 100. When large non-standard-size sheets are to be held, the second engaging member 120 disengageably engages with the rack gear 92 (a second retaining member), so that the trailing-end restricting unit 100 is retained at a position at which the trailing end position of the large non-standard-size sheets is to be restricted (hereinafter referred to as "second trailing-end restricting position").

Next, an operation for setting the trailing-end restricting unit 100 to the first trailing-end restricting position or the second trailing-end restricting position will be described. In the case of setting the trailing-end restricting unit 100 to the first trailing-end restricting position at which the trailing end position of small standard-size sheets is to be restricted, with the extension cassette 90 at the first position, the user first rotates the control lever 111. This moves the second engaging member 120 upwards. When the second engaging member 120 is in engagement with the rack gear 92 at that time, the engagement between the second engaging member 120 and the rack gear 92 of the extension cassette 90 is released to enable the trailing-end restricting unit 100 to move, as shown in FIG. 4B, described above.

When the first engaging member 130 is in engagement with the groove 81, moving the trailing-end restricting unit 100 brings the engaging portion 130*a* of the first engaging member 130, shown in FIGS. 3A and 3B described above, into pressure-contact with the edge of the groove 81. This moves the first engaging member 130 upwards against the elastic force of the second elastic member 131 to disengage the engaging portion 130*a* from the groove 81. After that, the trailing-end restricting unit 100 moves while sliding the first engaging member 130 on the flat portion 82. When the trailing-end restricting unit 100 reaches the first trailing-end restricting position, the engaging portion 130*a* of the first engaging member 130 is fit in the groove 81 from the flat portion 82 by the elastic force of the second elastic member 131, as shown in FIG. 5A. Thus, the trailing-end restricting unit 100 is retained at the first trailing-end restricting position corresponding to the size of the small standard-size sheets to be held. The sound and feeling (the sense of clicking) generated at that time allows the user to determine that the trailing-end restricting unit 100 has reached the first trailing-end restricting position.

In the case of setting the trailing-end restricting unit 100 to the second trailing-end restricting position, the user draws the extension cassette 90 and then rotates the control lever 111, as described above. This elevates the second engaging member 120, which has been in engagement with the rack gear 92, to disengage the second engaging member 120 from the rack gear 92, allowing the trailing-end restricting unit 100 to move. When the engaging portion 130*a* of the first engaging member 130 is fit in the groove 81, the engaging portion 130*a* of the first engaging member 130 is disengaged from the groove 81 by moving the trailing-end restricting unit 100.

In this state, when the user moves the trailing-end restricting unit 100 to the second trailing-end restricting position corresponding to the size of the large non-standard-size sheets to be held and then releases the control lever 111, the second engaging member 120 engages with the rack gear 92 by the urging force of the first elastic member 121. This causes the trailing-end restricting unit 100 to be set at the second trailing-end restricting position according to the large non-standard-size sheets to be held and to be retained at the position.

In this embodiment, the rack gear 92 is provided in the moving range of the trailing-end restricting unit 100, as described above. When large non-standard-size sheets and large standard-size sheets are to be held, with the extension cassette 90 positioned at the second position, the second engaging member 120 is brought into engagement with the rack gear 92, as shown in FIG. 5B.

This allows the trailing-end restricting unit 100 to be retained at the second trailing-end restricting position or a position at which the trailing end position of the large standard-size sheets is to be restricted (hereinafter referred to as "third trailing-end restricting position"). To hold small non-standard-size sheets, with the extension cassette 90 at the first position, the second engaging member 120 is brought into engagement with the rack gear 92. This allows the trailing-end restricting unit 100 to be retained at a position at which the trailing end position of the small non-standard-size sheets is to be restricted (hereinafter referred to as "fourth trailing-end restricting position").

In this embodiment, for small standard-size sheets, engaging the first engaging member 130 with the groove 81 provided at the main cassette 80 allows the trailing-end restricting unit 100 to be retained at the first trailing-end restricting position, as described above. For large standard-size sheets and large non-standard-size sheets, engaging the second engaging member 120 with the rack gear 92 provided at the extension cassette 90 allows the trailing-end restricting unit 100 to be respectively retained at the second and third trailing-end restricting positions.

In other words, in this embodiment, when extension cassette 90 is drawn, the first engaging member 130 does not engage with the groove 81, but the second engaging member 120 engages with the rack gear 92. With this configuration, when the user sets the trailing-end restricting unit 100 to the second or third trailing-end restricting position, with the extension cassette 90 drawn, the user has no sense of clicking. This prevents the user from erroneously setting the trailing-end restricting unit 100, allowing the trailing-end restricting unit 100 to be retained at a proper position.

Furthermore, in this embodiment, when the sheet cassette 31 is mounted, the main cassette 80 is positioned in the printer main body 10, and the extension cassette 90 is positioned in the main cassette 80. Disposing the grooves 81 at the main cassette 80, which is positioned in the printer main body 10 when the sheet cassette 31 is mounted, allows the trailing-end restricting unit 100 to be retained at the first trailing-end restricting position more accurately than disposing the grooves 81 at the extension cassette 90.

Figure 6:
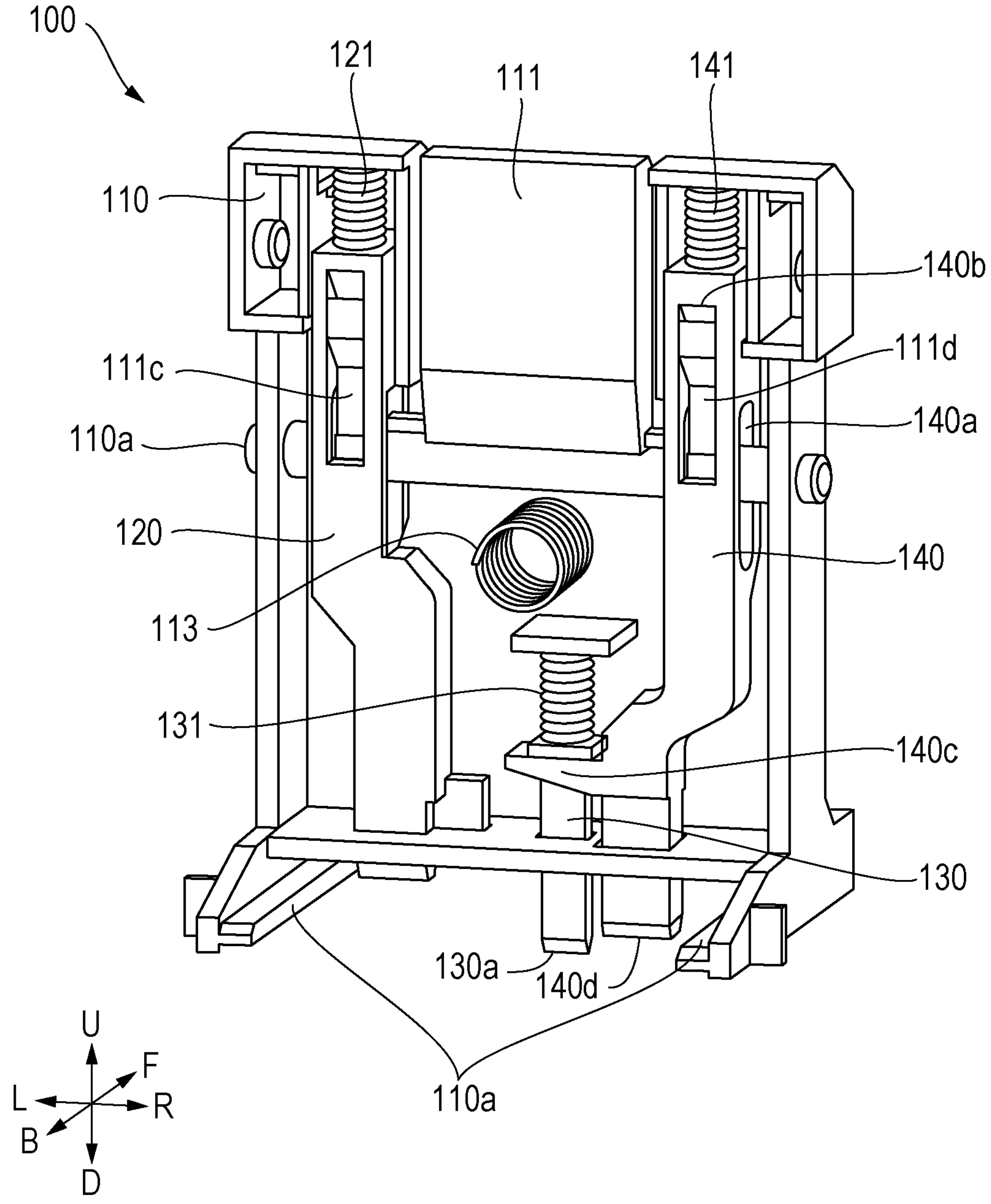
FIG. 6 is a diagram illustrating the configuration of a trailing-end restricting unit provided at a sheet cassette of a sheet feeding apparatus according to a second embodiment of the present disclosure.

A second embodiment of the present disclosure will be described. FIG. 6 is a diagram illustrating the configuration of a trailing-end restricting unit provided at a sheet cassette of a sheet feeding apparatus according to this embodiment. In FIG. 6, the same reference signs as those in FIGS. 3A and 3B denote the same or corresponding parts.

As shown in FIG. 6, the trailing-end restricting unit 100 includes an engaging member 140 (hereinafter referred to as "third engaging member") having claws 140*d* at the bottom to engage with the main cassette 80, in addition to the trailing-end restricting case 110, the first engaging member 130, and the second engaging member 120. The trailing-end restricting unit 100 further includes a third elastic member 141 that urges the third engaging member 140 downwards. The third engaging member 140 is disposed beside the first engaging member 130. The trailing-end restricting case 110 vertically movably supports the second engaging member 120, the first engaging member 130, and the third engaging member 140.

The third engaging member 140 has a vertically long hole 140*a* through which the rotation shaft 111*a* of the control lever 111 passes. The third engaging member 140 is supported by the trailing-end restricting case 110 so as to be movable in the up-and-down direction via the rotation shaft 111*a* passed through the long hole 140*a*. The third engaging member 140 has a restricting portion 140*c* that restricts the downward movement of the first engaging member 130 and moves the first engaging member 130 upwards together with the third engaging member 140 that moves upwards.

In this embodiment, the control lever 111 has, at one end of the rotation shaft 111*a* in the lateral direction, a receiving portion 111*c* having a V-shaped groove 111*c*1 at the top, as shown in FIGS. 4A and 4B described above. The control lever 111 has, at the other end of the rotation shaft 111*a* in the lateral direction, a receiving portion 111*d* having a V-shaped groove at the top, as the receiving portion 111*c* does. The third engaging member 140 has a tapered securing portion 140*b* fit in the V-shaped groove of the receiving portion 111*d*. The tapered securing portion 140*b* is normally urged downwards by the third elastic member 141 into the V-shaped groove of the receiving portion 111*d*, like the second engaging member 120, shown in FIG. 4A described above.

Because of this, when the control lever 111 is rotated, the second engaging member 120 and the third engaging member 140 are elevated, as in the first embodiment. When the third engaging member 140 is elevated, the first engaging member 130 is elevated together with the third engaging member 140 by the restricting portion 140*c* of the third engaging member 140.

Figure 7A:
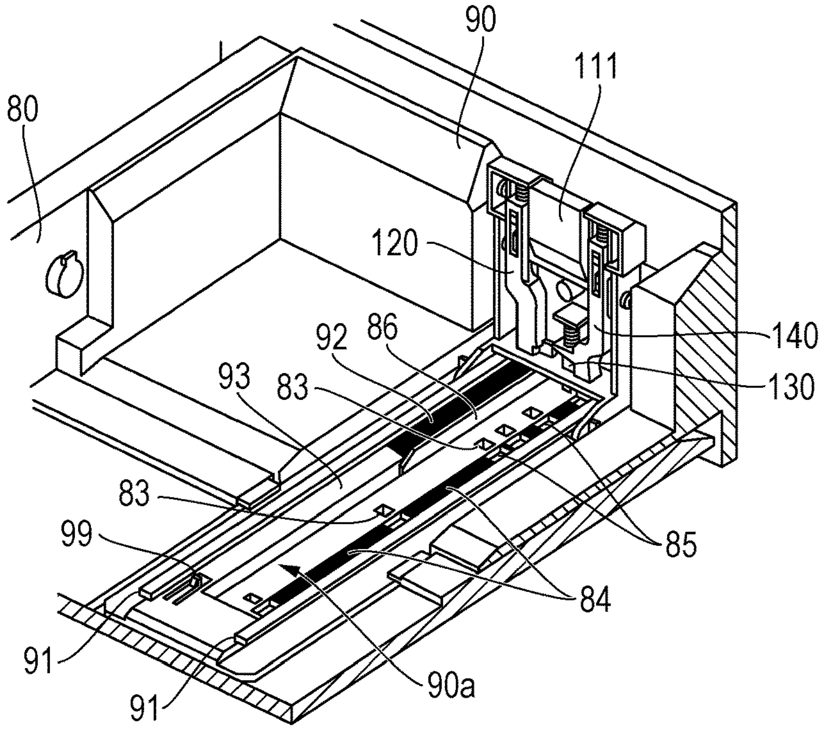
FIG. 7A is a diagram illustrating the sheet cassette, with the extension cassette pushed therein.
Figure 7B:
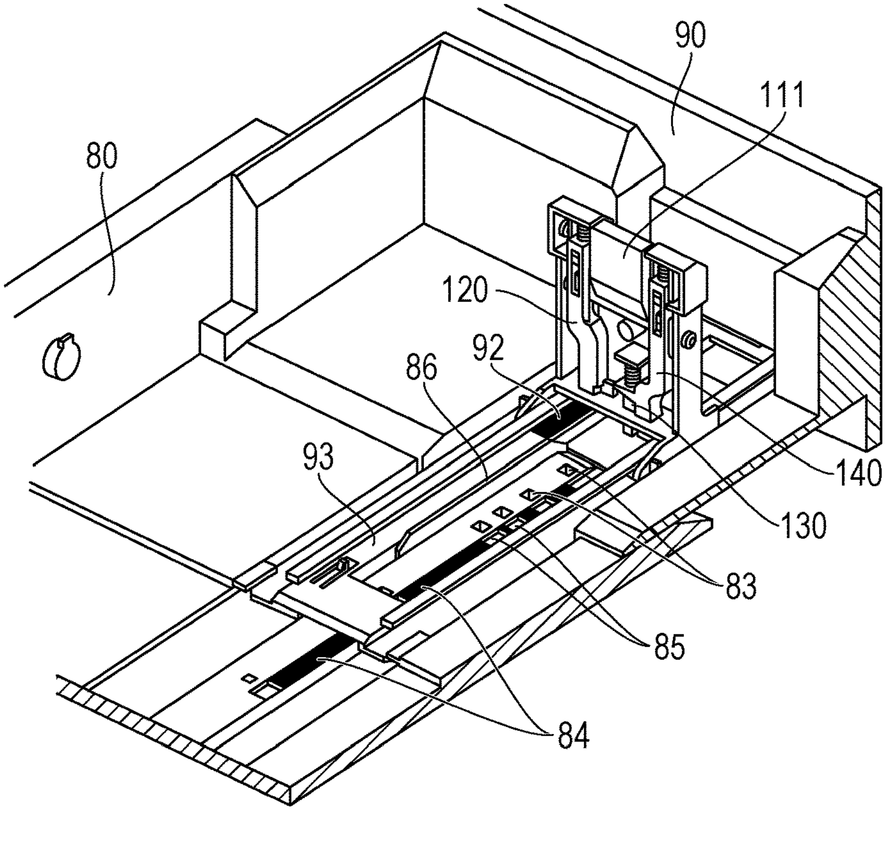
FIG. 7B is a diagram illustrating the sheet cassette, with the extension cassette drawn therefrom.

As shown in FIGS. 7A and 7B, the main cassette 80 has recessed portions 83 (another first retaining member) for setting the trailing-end restricting unit 100 to the first trailing-end restricting position. The recessed portions 83 are disposed at positions corresponding to the trailing end positions of various small standard-size sheets to be held in the sheet cassette 31. When the trailing-end restricting unit 100 is moved in the front-to-back direction, the first engaging member 130 engages with one of the recessed portions 83. The main cassette 80 further has a rack gear 84, which is a toothed portion, in a range in which the trailing-end restricting unit 100 moves. Engaging the third engaging member 140 with the rack gear 84 (a third retaining member) allows the trailing-end restricting unit 100 to be set at the first or fourth trailing-end restricting position.

Toothless portions 85 are disposed at positions of the rack gear 84 corresponding to the trailing end positions of small standard-size sheets, that is, beside the recessed portions 83. This causes the third engaging member 140 beside the first engaging member 130 to face corresponding one of the toothless portions 85 of the rack gear 84 when the first engaging member 130 engages with one of the recessed portions 83, preventing the third engaging member 140 from engaging with the rack gear 84.

Figure 8A:
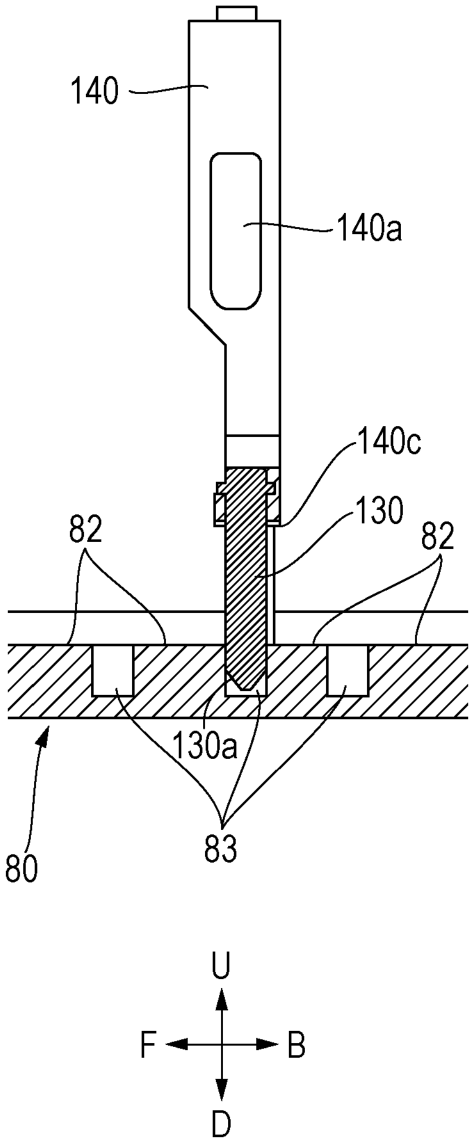
FIG. 8A is a diagram illustrating the state of engagement between a first engaging member and the main cassette when the trailing-end restricting unit is at a first trailing-end restricting position.
Figure 8B:
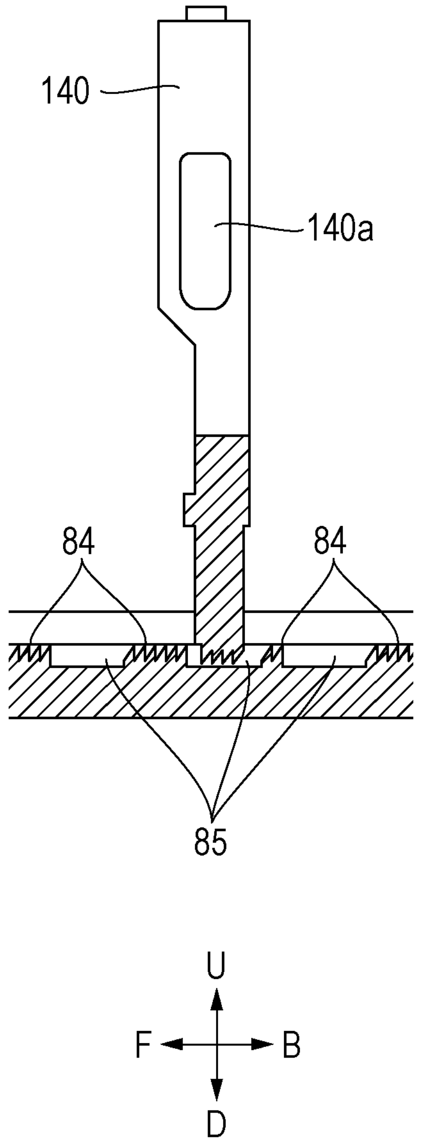
FIG. 8B is a diagram illustrating the state of engagement between a third engaging member and the main cassette when the trailing-end restricting unit is at the first trailing-end restricting position.

With this configuration, when the trailing-end restricting unit 100 is at the first trailing-end restricting position, the first engaging member 130 is fit in one of the recessed portion 83 of the main cassette 80 and retained therein, as shown in FIG. 8A. At that time, the third engaging member 140 is positioned at corresponding one of the toothless portions 85 of the rack gear 84 and does not engages with the rack gear 84, as shown in FIG. 8B. In other words, this embodiment is configured such that when the first engaging member 130 engages with the recessed portion 83, the third engaging member 140 does not engage with the rack gear 84.

Figure 9A:
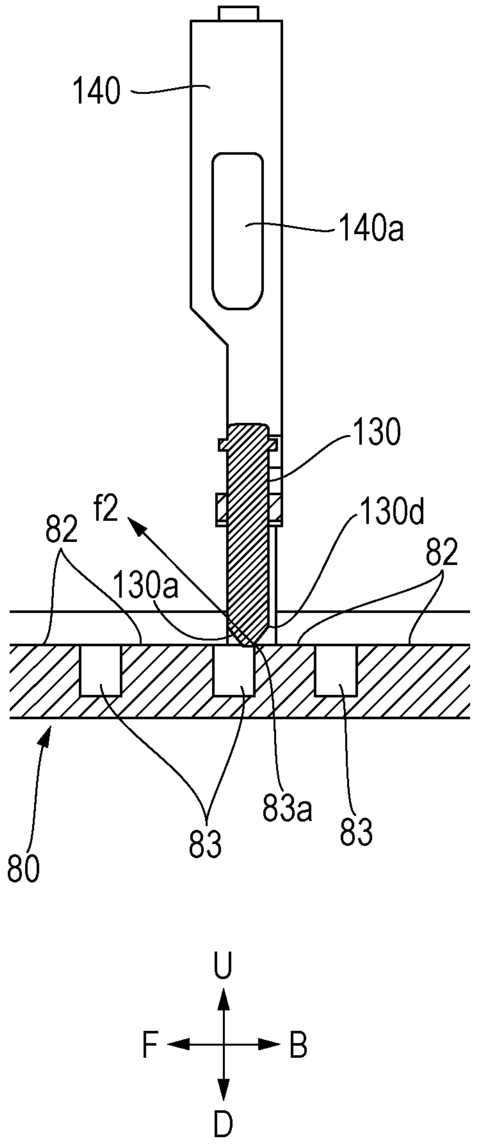
FIG. 9A is a diagram illustrating the state of engagement between the first engaging member and the main cassette when the trailing-end restricting unit is at a position a little deviating from the first trailing-end restricting position.

The user can release the control lever 111 when the trailing-end restricting unit 100 is at a position a little (about 2 mm) deviating from the first trailing-end restricting position. In this case, an edge 83*a* of the recessed portion 83 comes into contact with a tapered engaging portion 130*d* of the first engaging member 130, as shown in FIG. 9A. Since the first engaging member 130 is urged downwards by the second elastic member 131, the slope of the engaging portion 130*d* is subjected to a force f2, and this component force acts forwards.

Figure 9B:
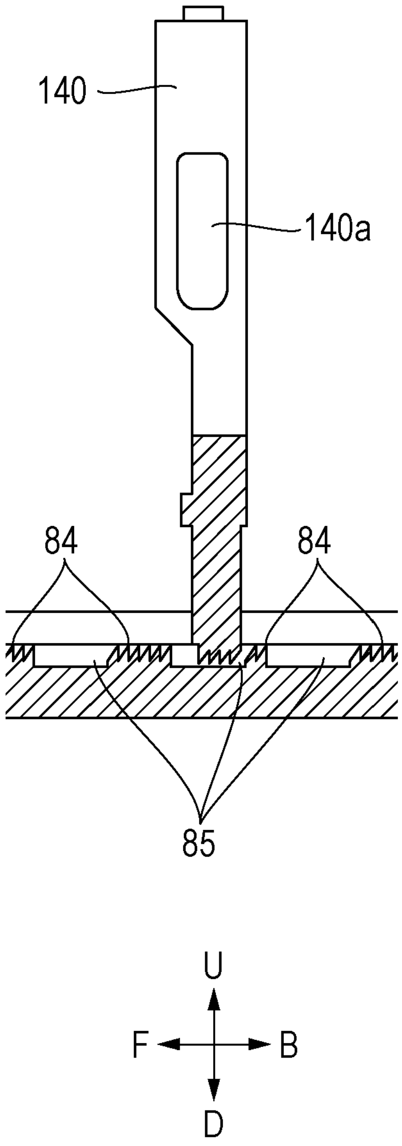
FIG. 9B is a diagram illustrating the state of engagement between the third engaging member and the main cassette when the trailing-end restricting unit is at a position a little deviating from the first trailing-end restricting position.

At that time, the third engaging member 140 is not in engagement with the main cassette 80 because the third engaging member 140 is positioned in the toothless portion 85 of the rack gear 84 of the main cassette 80, as shown in FIG. 9B. For this reason, the trailing-end restricting unit 100 moves forwards by the component force that the first engaging member 130 receives, and the engaging portion 130*a* of the first engaging member 130 is fit in the recessed portion 83 of the main cassette 80, as shown in FIG. 8A.

With this configuration, even if the user erroneously sets the trailing-end restricting unit 100 at a position deviating from the first trailing-end restricting position, the trailing-end restricting unit 100 can be automatically drawn to the desired first trailing-end restricting position after the user finishes the operation. This function is hereinafter referred to as a drawing function.

In this embodiment, the extension cassette 90 has the rack gear 92 only in a range in which the trailing-end restricting unit 100 moves when the extension cassette 90 is at the second position, as shown in FIGS. 7A and 7B. In other words, the extension cassette 90 has the rack gear 92 only in a range in which the trailing-end restricting unit 100 can restrict the trailing ends of large standard-size and large non-standard-size sheets.

A flat portion 93 is provided behind the back rack gear 92. When the trailing-end restricting unit 100 is in the flat portion 93, the trailing-end restricting unit 100 cannot engage with the extension cassette 90. The main cassette 80 has a rib-shaped anti-engagement portion 86, which is positioned beside the rack gear 92 of the extension cassette 90 when the extension cassette 90 is at the first position.

Figure 10A:
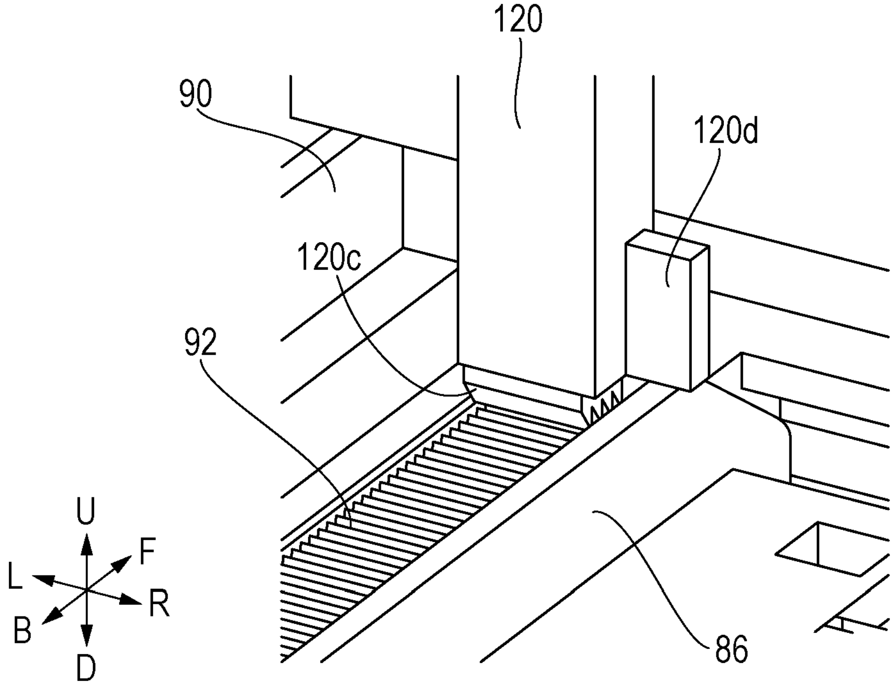
FIG. 10A is a perspective view illustrating a state in which a contact portion provided at a second engaging member is in contact with an anti-engagement portion provided at the extension cassette.
Figure 10B:
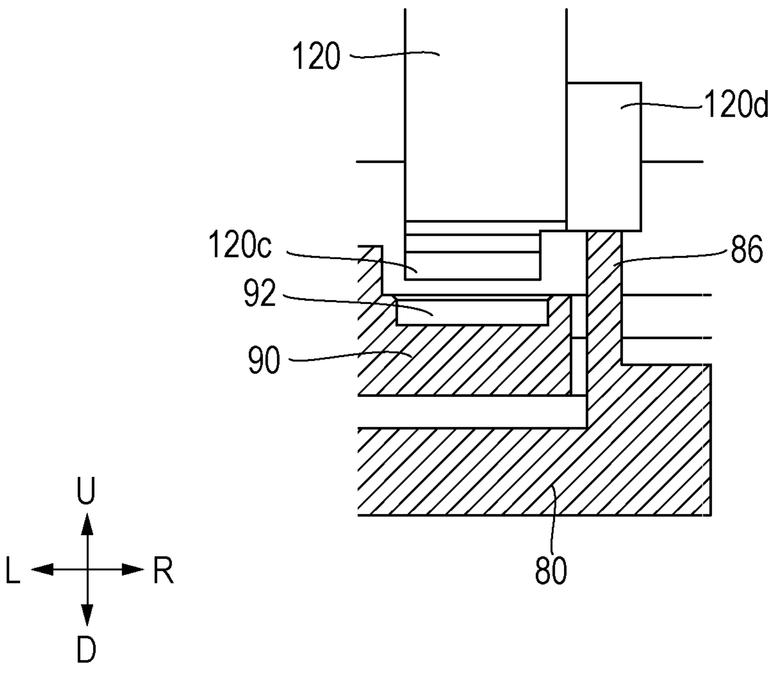
FIG. 10B is a perspective view illustrating a state in which the contact portion of the second engaging member is in contact with the anti-engagement portion of the extension cassette.

As shown in FIG. 10A, the second engaging member 120 has a restricting portion 120*d* that comes into contact with the upper surface of the anti-engagement portion 86. When the restricting portion 120*d* comes into contact with the anti-engagement portion 86 from the above, with the extension cassette 90 at the first position, the downward movement of the second engaging member 120 is restricted. This prevents the claws 120*c* of the second engaging member 120 from engaging with the rack gear 92, as shown in FIG. 10B. In other words, the anti-engagement portion 86 prevents the second engaging member 120 from engaging with the rack gear 92 when the extension cassette 90 is at the first position.

Thus, only when the extension cassette 90 is at the second position, the rack gear 92 and the second engaging member 120 engage to restrict the position of the trailing-end restricting unit 100. Furthermore, when the trailing-end restricting unit 100 is moved to the first or fourth trailing-end restricting position, with the extension cassette 90 at the first position, the anti-engagement portion 86 prevents the second engaging member 120 from engaging with the extension cassette 90, so that the drawing function is not interfered with.

Figure 11:
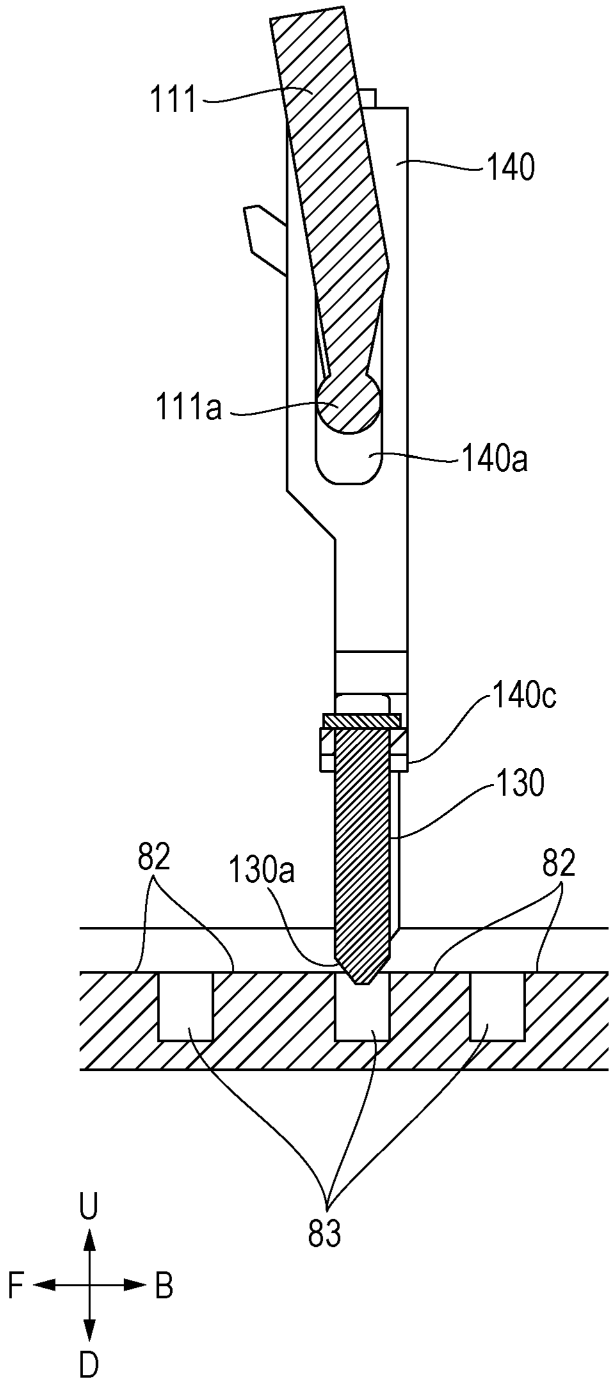
FIG. 11 is a diagram illustrating the state of engagement between the first engaging member and the main cassette when a control lever provided at the trailing-end restricting unit is rotated to the maximum.

Next, a configuration for giving the user the sense of clicking in setting the trailing-end restricting unit 100 to the trailing-end restricting position will be described. In this embodiment, the first engaging member 130 is configured not to rise above the flat portion 82 between the recessed portions 83 in a state in which the control lever 111 is rotated to the maximum, as shown in FIG. 11. However, if the user moves the trailing-end restricting unit 100, with the control lever 111 rotated, the first engaging member 130 is raised against the urging force of the second elastic member 131. This allows the trailing-end restricting unit 100 to move while sliding the first engaging member 130 over the flat portion 82 of the main cassette 80.

When the trailing-end restricting unit 100 moves to the vicinity of the first trailing-end restricting position, the engaging portion 130*a* of the first engaging member 130 is fit in one of the recessed portions 83 by the urging force of the second elastic member 131, so that the trailing-end restricting unit 100 is retained at the first trailing-end restricting position. The sound and feeling (the sense of clicking) generated at that time allows the user to determine that the trailing-end restricting unit 100 is retained at the first trailing-end restricting position.

Thus, when the extension cassette 90 is at the second position, the rack gear 92 of the extension cassette 90 and the second engaging member 120 engage with each other, so that the trailing-end restricting unit 100 is retained at the second or third trailing-end restricting position, as shown in FIG. 7B. When small non-standard-size sheets are to be held, with the extension cassette 90 at the first position, the rack gear 84 of the main cassette 80 and the third engaging member 140 engage with each other, so that the trailing-end restricting unit 100 is retained at the fourth trailing-end restricting position.

When small standard-size sheets are to be held, with the extension cassette 90 at the first position, one of the recessed portions 83 of the main cassette 80 and the first engaging member 130 engage with each other, so that the trailing-end restricting unit 100 is retained at the first trailing-end restricting position. Furthermore, also when the trailing-end restricting unit 100 is being set at a position minutely deviating from the first trailing-end restricting position, the trailing-end restricting unit 100 can be retained at a correct position using the above-described drawing function.

Thus, in this embodiment, when the first engaging member 130 engages with one of the recessed portions 83 of the main cassette 80, the second engaging member 120 does not engage with the rack gear 92 of the extension cassette 90. At that time, also the third engaging member 140 does not engage with the rack gear 84 of the main cassette 80. When the rack gear 92 of the extension cassette 90 and the second engaging member 120 engage with each other, with the extension cassette 90 at the second position, the first engaging member 130 does not engage with the recessed portion 83 of the main cassette 80.

In other words, in this embodiment, when the extension cassette 90 is drawn, the first engaging member 130 does not engage with the recessed portions 83 of the main cassette 80, but the rack gear 92 of the extension cassette 90 engages with the second engaging member 120. With this configuration, when the user sets the trailing-end restricting unit 100 at the second or third trailing-end restricting position, with the extension cassette 90 drawn, the user does not have the sense of clicking. This prevents the user from erroneously setting the trailing-end restricting unit 100, allowing the trailing-end restricting unit 100 to be retained at a correct position.

In this embodiment, when the sheet cassette 31 is mounted, the main cassette 80 is positioned in the printer main body 10, and the extension cassette 90 is positioned in the main cassette 80. Since the main cassette 80, which is positioned in the printer main body 10 when the sheet cassette 31 is mounted, has the recessed portions 83, the trailing-end restricting unit 100 can be retained at the first trailing-end restricting position more accurately than when the recessed portions 83 are disposed at the extension cassette 90.

Figure 12:
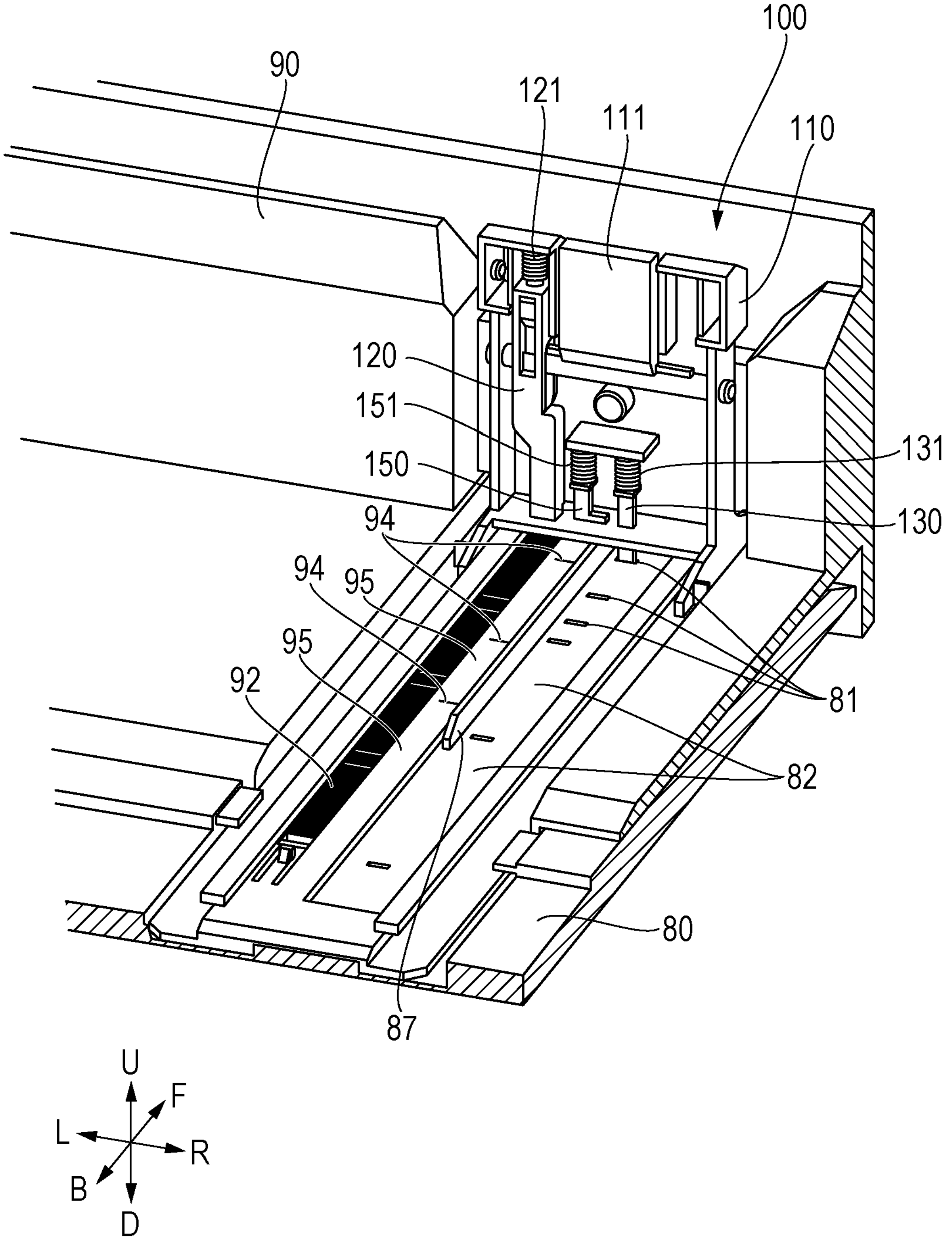
FIG. 12 is a diagram illustrating the configuration of a sheet cassette of a sheet feeding apparatus according to a third embodiment of the present disclosure.

Next, a third embodiment of the present disclosure will be described. FIG. 12 is a diagram illustrating the configuration of a sheet cassette of a sheet feeding apparatus according to this embodiment. In FIG. 12, the same reference signs as those of FIGS. 5A and 5B denote the same or corresponding parts. For the sheet cassette 31 of this embodiment, the largest-size sheet of the small standard-size sheets is an A4-size sheet of portrait orientation, and the largest-size sheet of the large standard-size sheets is a ledger-size sheet of portrait orientation. Between the A4-size of portrait orientation and the ledger-size of portrait orientation, legal-size of portrait orientation and A3-size of portrait orientation are standard sizes.

As shown in FIG. 12, the trailing-end restricting unit 100 includes an engaging member 150 (hereinafter referred to as "fourth engaging member") having a tapered engaging portion (not shown) at the bottom to engage with the extension cassette 90, in addition to the first engaging member 130 and the second engaging member 120. The trailing-end restricting unit 100 further includes a fourth elastic member 151 that urges the fourth engaging member 150 downwards.

The extension cassette 90 has a flat portion 95 extending in the front-to-back direction and grooves 94 (a fourth retaining member) provided in the flat portion 95. The grooves 94 are used to set the trailing-end restricting unit 100 at the third trailing-end restricting position when the extension cassette 90 is at the second position. The grooves 94 are click grooves for notifying the user that the trailing-end restricting unit 100 has moved to the third trailing-end restricting position by giving a sense of clicking and engage with the fourth engaging member 150 when the trailing-end restricting unit 100 is moved in the front-to-back direction.

To move the trailing-end restricting unit 100 to the third trailing-end restricting position, with the extension cassette 90 at the second position, the fourth engaging member 150 slides over the flat portion 95 between the grooves 94. When the trailing-end restricting unit 100 has moved to the vicinity of the third trailing-end restricting position, the fourth engaging member 150 fits in one of the grooves 94 from the flat portion 95, so that the trailing-end restricting unit 100 is retained at the third trailing-end restricting position. The sound and feeling (the sense of clicking) generated at that time allows the user to determine that the trailing-end restricting unit 100 is retained at the third trailing-end restricting position.

To move the trailing-end restricting unit 100 to the second trailing-end restricting position, with the extension cassette 90 at the second position, the fourth engaging member 150 slides over the flat portion 95 between the grooves 94. When the trailing-end restricting unit 100 has moved to the second trailing-end restricting position, the second engaging member 120 engages with the rack gear 92 of the extension cassette 90.

To retain the trailing-end restricting unit 100 at the first trailing-end restricting position, with the extension cassette 90 at the first position, the first engaging member 130 is brought into engagement with one of the grooves 81, as in the embodiment described above. The main cassette 80 is provided with a rib-shaped anti-engagement portion 87 to prevent one of the grooves 94 of the extension cassette 90 and the fourth engaging member 150 from engaging with each other when the extension cassette 90 is at the first position. In this embodiment, the downward movement of the fourth engaging member 150 is restricted by the anti-engagement portion 87 to prevent the fourth engaging member 150 from engaging with the groove 94, as in the relationship between the anti-engagement portion 86 and the second engaging member 120 in the second embodiment described above.

As described above, in this embodiment, the extension cassette 90 is provided with the grooves 94 and the rack gear 92, and when the extension cassette 90 is at the second position, the trailing-end restricting unit 100 is brought into engagement with one of the grooves 94 or the rack gear 92 of the extension cassette 90. This prevents the user from erroneously setting the trailing-end restricting unit 100 even when the extension cassette 90 is drawn, allowing the trailing-end restricting unit 100 to be retained at a proper position.

Figure 13:
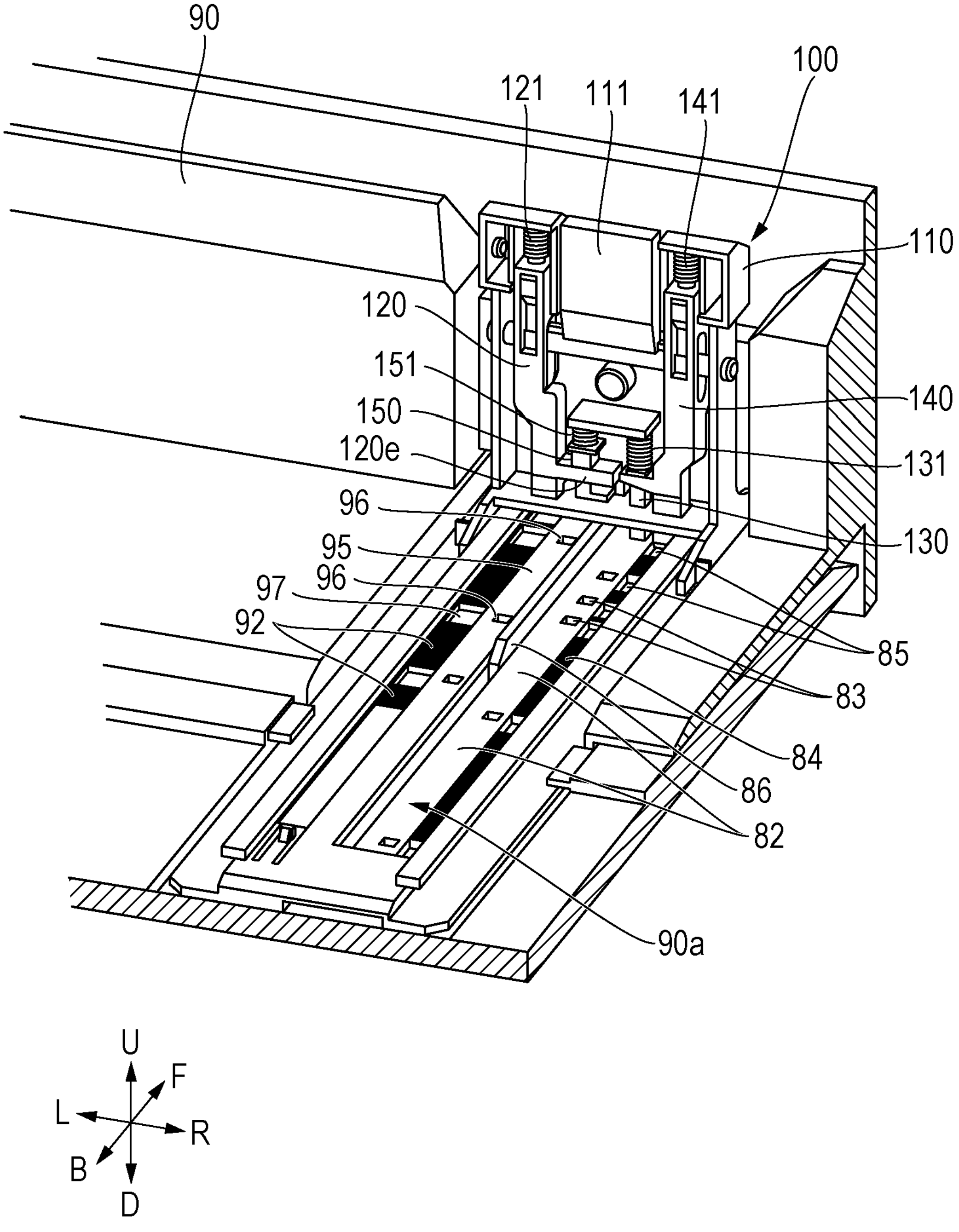
FIG. 13 is a diagram illustrating the configuration of a sheet cassette of a sheet feeding apparatus according to a fourth embodiment of the present disclosure.

Next, a fourth embodiment of the present disclosure will be described. FIG. 13 is a diagram illustrating the configuration of a sheet cassette of a sheet feeding apparatus according to this embodiment. In FIG. 13, the same reference signs as those in FIGS. 7A and 7B denote the same or corresponding parts. For the sheet cassette 31 of this embodiment, the largest-size sheet of the small standard-size sheets is an A4-size sheet of portrait orientation, and the largest-size sheet S2 of the large standard-size sheets is a ledger-size sheet of portrait orientation. Between the A4-size of portrait orientation and the ledger size of portrait orientation, legal-size of portrait orientation and A3-size of portrait orientation are standard sizes.

As shown in FIG. 13, the trailing-end restricting unit 100 includes the fourth engaging member 150 in addition to the trailing-end restricting case 110, the first engaging member 130, the second engaging member 120, and the third engaging member 140. In other words, the trailing-end restricting unit 100 of this embodiment includes the second embodiment described above includes the fourth engaging member 150 and the fourth elastic member 151 of the third embodiment in addition to the members of the trailing-end restricting unit 100 of the second embodiment.

The second engaging member 120 has a restricting portion 120*e*, at the lower part, that restricts the downward movement of the fourth engaging member 150 and elevates the fourth engaging member 150 together with the upward movement of the second engaging member 120. This causes all the engaging members 120, 130, 140, and 150 to be elevated as the control lever 111 rotates.

The extension cassette 90 has recessed portions 96 (another fourth retaining member) for retaining the trailing-end restricting unit 100 at the third trailing-end restricting position when the extension cassette 90 is at the second position. The recessed portions 96 are click grooves for notifying the user that the trailing-end restricting unit 100 has moved to the third trailing-end restricting position by giving a sense of clicking and engage with the fourth engaging member 150 when the trailing-end restricting unit 100 is moved in the front-to-back direction.

The extension cassette 90 further includes a rack gear 92 (another second retaining member), which is a toothed portion for setting the trailing-end restricting unit 100 at the second trailing-end restricting position. The rack gear 92 is disposed only in a range in which the trailing-end restricting unit 100 moves, with the extension cassette at the second position. Toothless portions 97 are disposed at positions of the rack gear 92 corresponding to the trailing end positions of large standard-size sheets, that is, beside the recessed portions 96. This prevents the second engaging member 120 from engaging with the rack gear 92 when the fourth engaging member 150 engages with one of the recessed portions 96.

In this embodiment, the relationship between the fourth engaging member 150 and the recessed portions 96 of the extension cassette 90 is set the same as the relationship between the first engaging member 130 and the recessed portions 83 in the second embodiment described above. In other words, the fourth engaging member 150 is configured not to rise above the flat portion 95 between the recessed portions 96 in a state in which the control lever 111 is rotated to the maximum.

Therefore, if the user moves the trailing-end restricting unit 100, with the control lever 111 rotated, when the extension cassette 90 is at the second position, the fourth engaging member 150 is raised against the urging force of the fourth elastic member 151. Then, the trailing-end restricting unit 100 moves while sliding the fourth engaging member 150 over the flat portion 95. When the trailing-end restricting unit 100 has moved to the vicinity of the third trailing-end restricting position, the engaging portion of the fourth engaging member 150 is fit in one of the recessed portions 96 by the urging force of the fourth elastic member 151 to retain the trailing-end restricting unit 100 at the third trailing-end restricting position. Thus, also in this embodiment, even if the user erroneously sets the trailing-end restricting unit 100 at a position deviating from the third trailing-end restricting position, the trailing-end restricting unit 100 can be automatically drawn to the desired third trailing-end restricting position after the user finishes the operation.

Furthermore, the main cassette 80 includes the anti-engagement portion 86 in a range in which the rack gear 92 is provided to prevent the rack gear 92 and the second engaging member 120 from engaging with each other when the extension cassette 90 is at the first position, as in the second embodiment. The anti-engagement portion 86 comes into contact with the fourth engaging member 150 when the extension cassette is at the first position to restrict the downward movement of the fourth engaging member 150.

The anti-engagement portion 86 has such a height that the lower end of the fourth engaging member 150 is positioned above the flat portion 95 when in contact with the fourth engaging member 150. This prevents the fourth engaging member 150 from engaging with the recessed portions 96 when the user moves the trailing-end restricting unit 100, with the control lever 111 rotated, in a state in which the extension cassette 90 is at the first position, so that the drawing function of the main cassette is not interfered with.

Thus, according to this embodiment, when the extension cassette 90 is at the second position, engaging the rack gear 92 of the extension cassette 90 with the second engaging member 120 allows the trailing-end restricting unit 100 to be retained at the second trailing-end restricting position. Furthermore, when the extension cassette 90 is at the second position, engaging one of the recessed portions 96 of the extension cassette 90 with the fourth engaging member 150 allows the trailing-end restricting unit 100 to be retained at the third trailing-end restricting position.

When the extension cassette 90 is at the first position, engaging the rack gear 84 of the main cassette 80 with the third engaging member 140 allows the trailing-end restricting unit 100 to be retained at the fourth trailing-end restricting position. When the extension cassette 90 is at the first position, engaging the recessed portion 83 of the main cassette 80 with the first engaging member 130 allows the trailing-end restricting unit 100 to be retained at the first trailing-end restricting position.

Furthermore, also when the trailing-end restricting unit 100 is being set at a position minutely deviating from the first trailing-end restricting position, the trailing-end restricting unit 100 can be retained at a correct position using the above-described drawing function.

As described above, in this embodiment, the extension cassette 90 has the recessed portions 96 and the rack gear 92, and when the extension cassette 90 is at the second position, the trailing-end restricting unit 100 is brought into engagement with the recessed portions 96 or the rack gear 92 of the extension cassette 90, as described above. This prevents the user from erroneously setting the trailing-end restricting unit 100 even when the extension cassette 90 is drawn, allowing the trailing-end restricting unit 100 to be retained at a proper position.

In the above description, the trailing-end restricting unit 100 is retained by the extension cassette 90, and when the extension cassette 90 is at the first position, the trailing-end restricting unit 100 is in engagement with one of the grooves 81, one of the recessed portions 83, or the rack gear 84. Because of this, when the extension cassette 90 is moved from the first position to the second position, only the extension cassette 90 moves first. Then, the stopper 99 of the extension cassette 90 comes into contact with the trailing-end restricting unit 100. The operation of drawing the extension cassette 90 may be performed without a load when the stopper 99 comes into contact with the trailing-end restricting unit 100.

Figure 14A:
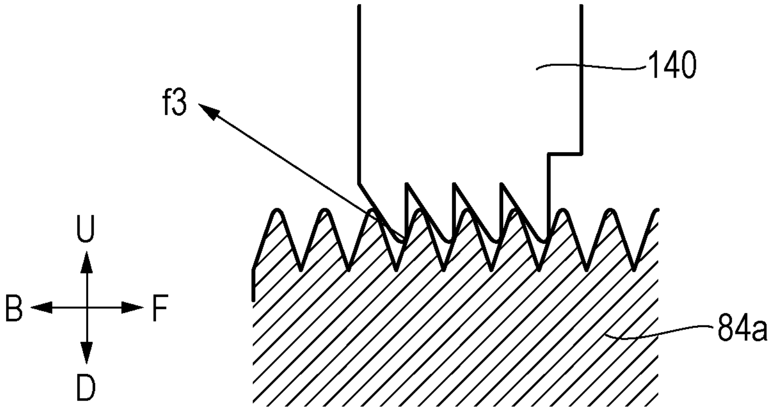
FIG. 14A is a diagram illustrating a rack gear of a main cassette according to a fifth embodiment of the present disclosure.

Next, a fifth embodiment of the present disclosure in which the operation of drawing the extension cassette 90 can be performed without a load will be described. In this embodiment, FIG. 14A illustrates an upstream end of the rack gear 84 of the main cassette 80 shown in FIG. 13 in the drawing direction. This is a toothed portion 84*a* of the rack gear 84 positioned below the third engaging member 140 when the extension cassette 90 is drawn so that the trailing-end restricting unit 100 comes into contact with the stopper 99. This toothed portion 84*a* is tapered. The other part of the rack gear 84 has a slope at the front and a vertical surface at the rear end to prevent the trailing-end restricting unit 100 from moving forward even if pushed by the trailing ends of sheets S.

Figure 14B:
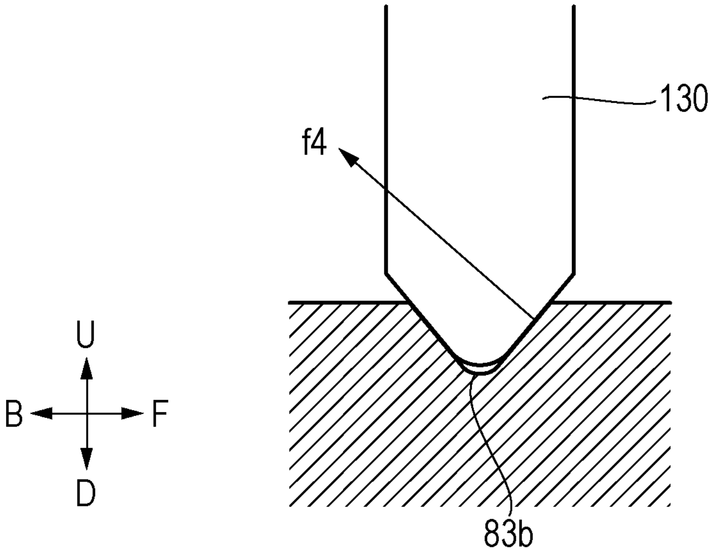
FIG. 14B is a diagram illustrating a recessed portion of the main cassette.

As shown in FIG. 14B, recessed portions 83*b* of the main cassette 80 provided at positions corresponding to the tapered toothed portion 84*a* have such a depth that only part of the end of the first engaging member 130 is fit. The other recessed portions 83 have such a depth that the first engaging member 130 does not come off even if the trailing-end restricting unit 100 is pushed by the trailing ends of sheets S.

In the case where the tapered rack gear 84*a* is formed at the upstream end of the rack gear 84 in the drawing direction, the rack gear 84*a* receives a reaction force f3 from the main cassette 80 when the trailing-end restricting unit 100 comes into contact with the stopper 99 to move forwards. The reaction force f3 acts in a direction in which the third engaging member 140 is elevated. In the case where the recessed portions 83*b* having such a depth that only part of the end of the first engaging member 130 is fit, the first engaging member 130 receives a reaction force f4 from the main cassette 80 when the trailing-end restricting unit 100 comes into contact with the stopper 99 to move forwards. The reaction force f4 acts in a direction in which the first engaging member 130 is elevated. Because of this, when the extension cassette 90 is further drawn after the stopper 99 comes into contact with the trailing-end restricting unit 100, the engagement of the trailing-end restricting unit 100 is released to allow the trailing-end restricting unit 100 to move together with the extension cassette 90.

Thus, according to this embodiment, when the stopper 99 of the extension cassette 90 comes into contact with the trailing-end restricting unit 100 when the extension cassette 90 is drawn, the trailing-end restricting unit 100 moves together with the extension cassette 90. This prevents an excessive load on the trailing-end restricting unit 100 and the extension cassette 90 when the user draws the extension cassette 90 and prevents damage on the components.

Furthermore, when the trailing-end restricting unit 100 is at the first trailing-end restricting position, the trailing-end restricting unit 100 is positioned at the back of the main body. This makes it difficult to view the trailing-end restricting unit 100 unless the sheet cassette 31 is completely drawn. However, in this embodiment, when the extension cassette 90 is drawn, the trailing-end restricting unit 100 is drawn together with the extension cassette 90. This allows the trailing-end restricting unit 100 to be drawn to a positon at which the trailing-end restricting unit 100 can easily be viewed even at the first trailing-end restricting position.

Figure 15A:
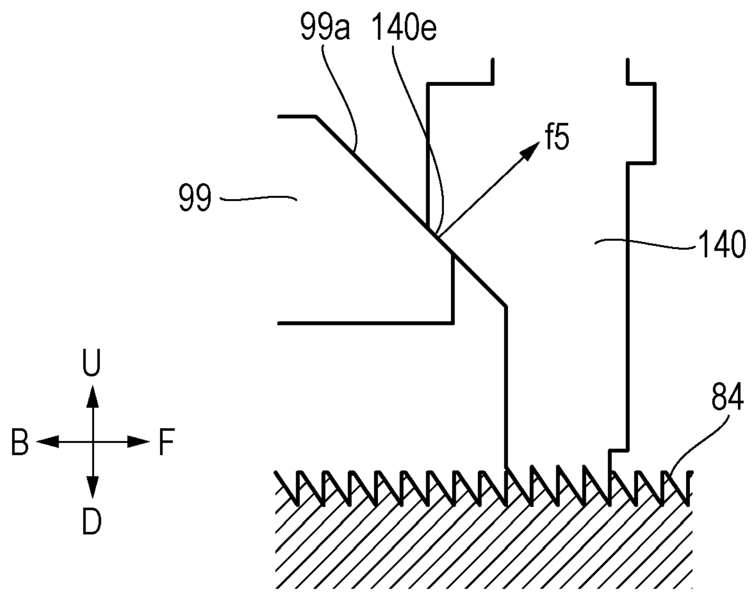
FIG. 15A is a diagram illustrating a third engaging member disposed at a trailing-end restricting unit of a sheet cassette and a stopper disposed at an extension cassette according to a sixth embodiment of the present disclosure.
Figure 15B:
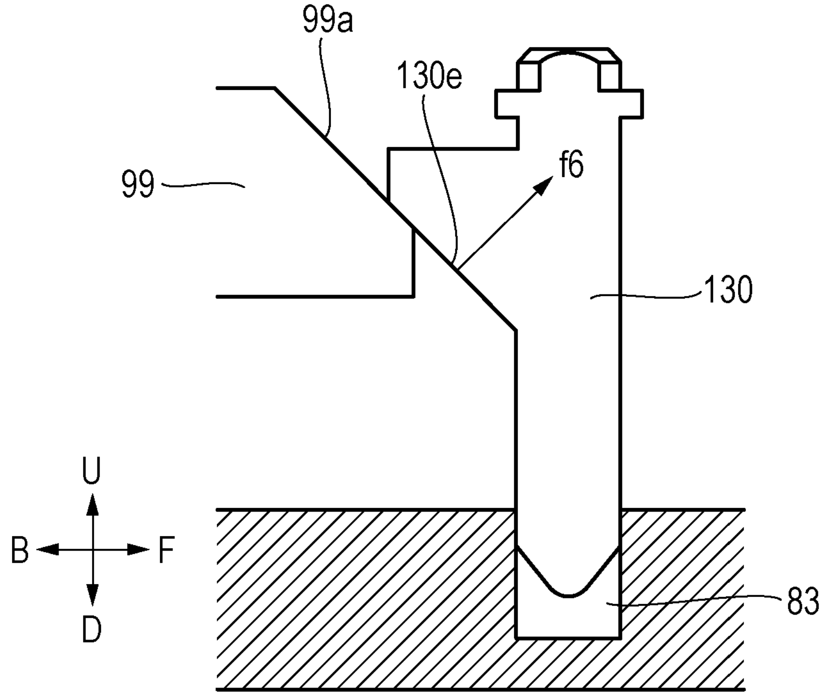
FIG. 15B is a diagram illustrating a first engaging member disposed at the trailing-end restricting unit and the stopper disposed at the extension cassette.

Next, a sixth embodiment of the present disclosure in which the operation of drawing the extension cassette 90 can be performed without a load will be described with reference to FIGS. 15A and 15B. As shown in FIG. 15A, the fourth engaging member 140 has, on the back wall, a slope 140*e* inclined so that the lower end is closer to the front than the upper end. As shown in FIG. 15B, the first engaging member 130 has, on the back wall, a slope 130*e* inclined so that the lower end is closer to the front than the upper end. Furthermore, the stopper 99 has, on the front wall, a slope 99*a* inclined so that the lower end is closer to the front than the upper end.

Because of this, when the stopper 99 comes into contact with the trailing-end restricting unit 100 in drawing the extension cassette 90, the slope 99*a* of the stopper 99 comes into contact with the slope 130*e* of the first engaging member 130 and the slope 140*e* of the third engaging member 140. At that time, the first engaging member 130 and the third engaging member 140 respectively receive a force f6 and a force f5 from the stopper 99 and are respectively elevated by the force f6 and the force f5. This releases the engagement of the trailing-end restricting unit 100 to allow the trailing-end restricting unit 100 to move together with the extension cassette 90.

Thus, according to this embodiment, when the stopper 99 of the extension cassette 90 comes into contact with the trailing-end restricting unit 100 in drawing the extension cassette 90, the trailing-end restricting unit 100 moves together with the extension cassette 90. This prevents an excessive load on the trailing-end restricting unit 100 and the extension cassette 90 when the user draws the extension cassette 90, thus preventing damage on the components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A sheet feeding apparatus comprising:

a sheet stacking plate on which sheets are to be stacked;

a cassette main body configured to support the sheet stacking plate;

a regulating device disposed at the cassette main body to be movable in a first direction and movable in a second direction opposite to the first direction, and configured to regulate an end position of the sheets;

a rack gear disposed at the cassette main body; and a plurality of engaged portions disposed at the cassette main body in the moving direction of the regulating device, wherein the plurality of engaged portions is arranged at positions separated from the rack gear with respect to a direction intersecting the moving direction of the regulating device, wherein the regulating device includes:

a holding member, a lever disposed rotatably at the holding member and configured to be operated, a first elastic member, a first engaging portion configured to be urged by the first elastic member to engage with the plurality of engaged portions, a second engaging portion movable in a vertical direction and configured to engage with the rack gear, a second elastic member configured to urge the second engaging portion downward, and an urging portion provided at the lever and configured to urge the second engaging portion upward against the second elastic member, wherein teeth of the rack gear are aligned in the direction of movement of the regulating device, wherein the lever includes a rotating shaft portion protruding in the direction intersecting the moving direction, and is rotatable with respect to the holding member using the rotating shaft portion, wherein the urging portion supports a contact region where the urging portion and the second engaging portion contact from below, wherein an upper end of the second elastic member is disposed above an upper end of the first elastic member, and wherein the first engaging portion moves upward against a force of the first elastic member by moving the regulating device in the moving direction in a state that the urging portion urges the second engaging portion upward away from the rack gear.

2. The sheet feeding apparatus according to claim 1, wherein, with respect to the vertical direction, the contact region is located between the second elastic member and the rotating shaft portion.

3. The sheet feeding apparatus according to claim 2, wherein a rotational movement of the lever moves the second engaging portion upward by the urging portion in a state in which the first engaging portion engages with a first engaged portion by the first elastic member.

4. The sheet feeding apparatus according to claim 3, wherein the first engaging portion has a protrusion to be inserted into the first engaged portion, and wherein the second engaging portion has a teeth shape, including more than one tooth, to be engaged with the rack gear.

5. The sheet feeding apparatus according to claim 4, wherein the protrusion is larger than the teeth shape in a height direction.

6. The sheet feeding apparatus according to claim 4, wherein the protrusion has a slope guided to the first engaged portion.

7. The sheet feeding apparatus according to claim 3, wherein the lever is configured in such a manner that the second engaging portion is moved in the vertical direction by the lever being rotated.

8. The sheet feeding apparatus according to claim 3, wherein the regulating device is configured to regulate a position of a trailing edge of the sheets.

9. The sheet feeding apparatus according to claim 3, wherein the plurality of engaged portions includes a plurality of grooves, and wherein the first engaging portion is able to be inserted into a groove of the plurality of grooves.

10. The sheet feeding apparatus according to claim 9, wherein the groove is a first groove and the plurality of engaged portions includes a flat portion between the first groove and a second groove in the moving direction, and wherein the first engaging portion moves upward by coming into contact with the flat portion.

* * * * *